US011895596B2

(12) United States Patent
Ryu et al.

(10) Patent No.: US 11,895,596 B2
(45) Date of Patent: *Feb. 6, 2024

(54) PATH-LOSS ESTIMATION USING PATH-LOSS REFERENCE SIGNAL ACTIVATION AND DEACTIVATION

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US); Tianyang Bai, Somerville, NJ (US); Junyi Li, Fairless Hills, PA (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,657

(22) Filed: Sep. 8, 2021

(65) Prior Publication Data

US 2021/0410076 A1    Dec. 30, 2021

Related U.S. Application Data

(63) Continuation of application No. 16/803,835, filed on Feb. 27, 2020, now Pat. No. 11,191,031.

(Continued)

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0048* (2013.01); *H04W 24/08* (2013.01);
(Continued)

(58) Field of Classification Search
None
See application file for complete search history.

(56) References Cited

U.S. PATENT DOCUMENTS

2010/0039970 A1* 2/2010 Papasakellariou .... H04L 5/0082
375/267
2010/0067512 A1* 3/2010 Nam .................... H04L 5/0023
375/267

(Continued)

FOREIGN PATENT DOCUMENTS

CN        103024884 A    4/2013

OTHER PUBLICATIONS

3GPP TS 38.213: "3rd Generation Partnership Project; Technical Specification Group Radio Access Network; NR; Physical Layer Procedures for Control (Release 15)", 3GPP Standard, Technical Specification, 3GPP TS 38.213, V15.6.0 (Jun. 2019), 3rd Generation Partnership Project (3GPP), Mobile Competence Centre, 650, Route Des Lucioles, F-06921 Sophia-Antipolis Cedex, France, vol. RAN WG1, No. V15.6.0, Jun. 24, 2019 (Jun. 24, 2019), pp. 1-107, XP051754327, [retrieved on Jun. 24, 2019] section 1 "Scope" section 8 "Random access procedure", Chapter 8. in particular table 8.1-1.

(Continued)

*Primary Examiner* — Tejis Daya
(74) *Attorney, Agent, or Firm* — Holland & Hart LLP

(57) ABSTRACT

Methods, systems, and devices for wireless communications are described. In some systems, a user equipment (UE) may perform path-loss estimation to support uplink transmit power control. The UE may perform path-loss estimations on path-loss reference signals configured by a base station. In some cases, the base station may update (e.g., activate, deactivate, or both) particular path-loss reference signals using a medium access control (MAC) control element (CE). The UE may determine which path-loss reference (Continued)

signal or signals to use for path-loss estimation based on one or more techniques. For example, the UE may filter path-loss measurements over a time duration or may use a single, unfiltered path-loss measurement for path-loss estimation. Additionally or alternatively, the UE may receive deactivated path-loss reference signals (e.g., for a set amount of time or for any amount of time) or may refrain from receiving deactivated path-loss reference signals.

30 Claims, 17 Drawing Sheets

Related U.S. Application Data

(60) Provisional application No. 62/900,584, filed on Sep. 15, 2019.

(51) Int. Cl.
*H04W 24/08* (2009.01)
*H04W 52/24* (2009.01)
*H04W 72/21* (2023.01)
*H04W 72/23* (2023.01)

(52) U.S. Cl.
CPC ......... *H04W 52/242* (2013.01); *H04W 72/21* (2023.01); *H04W 72/23* (2023.01)

(56) References Cited

U.S. PATENT DOCUMENTS

| | | |
|---|---|---|
| 2011/0134774 A1 | 6/2011 | Pelletier et al. |
| 2012/0076042 A1* | 3/2012 | Chun ............... H04L 69/28 370/252 |
| 2013/0142113 A1* | 6/2013 | Fong ............... H04L 1/1812 370/328 |
| 2013/0165134 A1 | 6/2013 | Touag et al. |
| 2013/0182687 A1 | 7/2013 | Ng et al. |
| 2013/0258959 A1 | 10/2013 | Dinan |
| 2014/0105042 A1* | 4/2014 | Cui ............... H04W 24/00 370/252 |
| 2014/0112260 A1 | 4/2014 | Sorrentino |
| 2014/0321406 A1 | 10/2014 | Marinier et al. |
| 2015/0148050 A1 | 5/2015 | Siomina et al. |
| 2015/0181593 A1 | 6/2015 | Kim et al. |
| 2015/0327181 A1 | 11/2015 | Bodas et al. |
| 2016/0262000 A1 | 9/2016 | Koorapaty et al. |
| 2016/0323769 A1 | 11/2016 | Yu et al. |
| 2017/0302355 A1 | 10/2017 | Islam et al. |
| 2018/0227793 A1 | 8/2018 | Kim et al. |
| 2018/0331805 A1* | 11/2018 | Xia ............... H04B 7/088 |
| 2019/0028170 A1* | 1/2019 | Zhang ............... H04B 7/0626 |
| 2019/0090205 A1 | 3/2019 | Gong et al. |
| 2019/0159136 A1 | 5/2019 | Molavianjazi et al. |
| 2019/0190747 A1* | 6/2019 | Park ............... H04W 72/23 |
| 2019/0223043 A1* | 7/2019 | Geng ............... H04W 36/0085 |
| 2019/0281588 A1* | 9/2019 | Zhang ............... H04B 7/0617 |
| 2019/0306765 A1 | 10/2019 | Cirik et al. |
| 2021/0084510 A1 | 3/2021 | Ryu et al. |
| 2021/0159991 A1* | 5/2021 | Zhou ............... H04L 5/0096 |
| 2021/0266845 A1* | 8/2021 | Zhou ............... H04W 52/146 |

OTHER PUBLICATIONS

3GPP TS 38.331: "3rd Generation Partnership Project; Technical Specification Group Radio Access Network; NR; Radio Resource Control (RRC) Protocol Specification (Release 15)", 3GPP Draft, Draft_38331-F60, 3rd Generation Partnership Project (3GPP), Mobile Competence Centre, 650, Route Des Lucioles, F-06921, Sophia-Antipolis Cedex, France, vol. RAN WG2, V15.6.0 (Jun. 2019), Jun. 22, 2019 (Jun. 22, 2019), XP051751335, pp. 1-517, Retrieved from the Internet: URL: http://www.3gpp.org/ftp/tsg%5Fran/WG2%5FRL2/Specifications/201906%5Fdraft%5Fspecs%5Fafter%5FRAN%5F84 [retrieved on Jun. 22, 2019] Section 5.5.3.2, pp. 197, 198, 384, 355, 192, 193, 314, 315.

Hina Telecom: "Enhancements on Multi-Beam Operation", R1-1908886, 3GPP TSG RAN WG1 #98, Prague, CZ, Aug. 26-30, 2019, pp. 1-5.

Ericsson: "Enhancements to Multi-Beam Operation", 3GPP Draft, 3GPP TSG-RAN WG1 Meeting #97, Tdoc R1-1907436 Enhancements to Multi-Beam Operation, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051728868, pp. 1-17, Retrieved from the Internet:URL:http://www.3gpp.org/ftp/Meetings%5F3GPP%5FSYNC/RAN1/Docs/R1%2D1907436%2Ezip [retrieved on May 13, 2019].

Ericsson: "Enhancements to Multibeam Operation", Tdoc R1-1909225, 3GPP TSG-RAN WG1 Meeting #98, Prague, Czech Republic, Aug. 26-30, 2019, pp. 1-24.

Huawei, et al., "Enhancements on Multi-Beam Operation", 3GPP Draft, 3GPP TSG RAN WG1 Meeting #98, R1-1908067, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764690, 20 Pages, Retrieved from the Internet: URL: http://www.3gpp.org/ftp/tsg_ran/WG1_RL1/TSGR1_98/Docs/R1-1908067.zip [retrieved on Aug. 17, 2019] The Whole Document, Paragraph [02.4], p. 4-p. 6, Table 1.

International Search Report and Written Opinion—PCT/US2020/044977—ISA/EPO—dated Oct. 21, 2020.

\* cited by examiner

PATH-LOSS ESTIMATION USING PATH-LOSS REFERENCE SIGNAL ACTIVATION AND DEACTIVATION

CROSS REFERENCE

The present Application for Patent is a Continuation of U.S. patent application Ser. No. 16/803,835 by RYU et al, entitled "PATH-LOSS ESTIMATION USING PATH-LOSS REFERENCE SIGNAL ACTIVATION AND DEACTIVATYION," filed Feb. 27, 2020, which claims the benefit of U.S. Provisional Patent Application No. 62/900,584 by RYU et al., entitled "PATH-LOSS ESTIMATION USING PATH-LOSS REFERENCE SIGNAL ACTIVATION AND DEACTIVATION," filed Sep. 15, 2019, assigned to the assignee hereof, and expressly incorporated herein.

INTRODUCTION

The following relates to wireless communications and more specifically to path-loss estimation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving, from a base station, a configuration for a set of configured reference signals for path-loss estimation, determining, from the set of configured reference signals, a reference signal to use for the path-loss estimation, calculating a path-loss estimate using the determined reference signal, and transmitting an uplink message according to an uplink transmit power based on the path-loss estimate.

An apparatus for wireless communications at a UE is described. The apparatus may include a processor and memory coupled to the processor, the processor and memory configured to receive, from a base station, a configuration for a set of configured reference signals for path-loss estimation, determine, from the set of configured reference signals, a reference signal to use for the path-loss estimation, calculate a path-loss estimate using the determined reference signal, and transmit an uplink message according to an uplink transmit power based on the path-loss estimate.

Another apparatus for wireless communications at a UE is described. The apparatus may include means for receiving, from a base station, a configuration for a set of configured reference signals for path-loss estimation, determining, from the set of configured reference signals, a reference signal to use for the path-loss estimation, calculating a path-loss estimate using the determined reference signal, and transmitting an uplink message according to an uplink transmit power based on the path-loss estimate.

A non-transitory computer-readable medium storing code for wireless communications at a UE is described. The code may include instructions executable by a processor to receive, from a base station, a configuration for a set of configured reference signals for path-loss estimation, determine, from the set of configured reference signals, a reference signal to use for the path-loss estimation, calculate a path-loss estimate using the determined reference signal, and transmit an uplink message according to an uplink transmit power based on the path-loss estimate.

Some examples of the method, apparatuses, and non-transitory computer-readable medium described herein may further include operations, features, means, or instructions for updating the determined reference signal, where determining the reference signal to use for the path-loss estimation may be based on the updating the determined reference signal.

In some examples of the method, apparatuses, and non-transitory computer-readable medium described herein, updating the determined reference signal may involve activating the determined reference signal and determining the reference signal to use for the path-loss estimation may be based on the determined reference signal being an activated reference signal.

Some examples of the method, apparatuses, and non-transitory computer-readable medium described herein may further include operations, features, means, or instructions for receiving, from the base station, a medium access control (MAC) control element (CE) indicating the reference signal, where the updating may be based on the MAC-CE.

Some examples of the method, apparatuses, and non-transitory computer-readable medium described herein may further include operations, features, means, or instructions for receiving, from the base station, a set of active reference signals corresponding to the determined reference signal following the updating and based on a periodicity of the determined reference signal and measuring a set of path-loss values based on receiving the set of active reference signals, where the path-loss estimate may be calculated using the measured set of path-loss values.

Some examples of the method, apparatuses, and non-transitory computer-readable medium described herein may further include operations, features, means, or instructions for performing layer 3 (L3) filtering on the measured set of path-loss values, where the path-loss estimate may be calculated based on the L3 filtering.

Some examples of the method, apparatuses, and non-transitory computer-readable medium described herein may further include operations, features, means, or instructions for determining the set of active reference signals to receive for the path-loss estimation based on a threshold number of active reference signals or a threshold duration for measuring the set of path-loss values or both.

Some examples of the method, apparatuses, and non-transitory computer-readable medium described herein may further include operations, features, means, or instructions for receiving, from the base station, the determined reference signal following the updating and measuring a path-loss value based on receiving the determined reference signal, where the path-loss estimate may be calculated using the measured path-loss value.

Some examples of the method, apparatuses, and non-transitory computer-readable medium described herein may further include operations, features, means, or instructions for updating an additional reference signal of the set of configured reference signals based on updating the determined reference signal, where the updating the additional reference signal may involve deactivating the additional reference signal.

Some examples of the method, apparatuses, and non-transitory computer-readable medium described herein may further include operations, features, means, or instructions for receiving, from the base station, the additional reference signal following the deactivating and measuring an additional path-loss value based on receiving the additional reference signal.

Some examples of the method, apparatuses, and non-transitory computer-readable medium described herein may further include operations, features, means, or instructions for further updating the additional reference signal, where the further updating the additional reference signal may involve re-activating the additional reference signal, calculating an additional path-loss estimate using the measured additional path-loss value, and transmitting an additional uplink message according to an additional uplink transmit power based on the additional path-loss estimate and the re-activating the additional reference signal.

Some examples of the method, apparatuses, and non-transitory computer-readable medium described herein may further include operations, features, means, or instructions for refraining from receiving the additional reference signal following the deactivating.

Some examples of the method, apparatuses, and non-transitory computer-readable medium described herein may further include operations, features, means, or instructions for activating a timer following the deactivating, receiving, from the base station, the additional reference signal following the deactivating if the timer is running, identifying an expiry of the timer, and refraining from receiving the additional reference signal following the deactivating if the timer is inactive.

Some examples of the method, apparatuses, and non-transitory computer-readable medium described herein may further include operations, features, means, or instructions for storing an additional path-loss estimate corresponding to the additional reference signal upon the deactivating, further updating the additional reference signal, where the further updating the additional reference signal may involve re-activating the additional reference signal, and transmitting an additional uplink message according to an additional uplink transmit power based on the stored additional path-loss estimate and the re-activating the additional reference signal.

In some examples of the method, apparatuses, and non-transitory computer-readable medium described herein, determining the reference signal of the set of configured reference signals to use for the path-loss estimation may include operations, features, means, or instructions for determining a set of active reference signals of the set of configured reference signals to use for a set of path-loss estimations corresponding to a set of communication beams.

In some examples of the method, apparatuses, and non-transitory computer-readable medium described herein, a number of reference signals in the set of active references signals may be less than or equal to a number of reference signals in the set of configured reference signals.

Some examples of the method, apparatuses, and non-transitory computer-readable medium described herein may further include operations, features, means, or instructions for transmitting, to the base station, an indication of a UE beamforming capability, where a number of reference signals in the set of configured reference signals or a number of reference signals in the set of active references signals or both may be based on the UE beamforming capability.

In some examples of the method, apparatuses, and non-transitory computer-readable medium described herein, receiving the configuration may include operations, features, means, or instructions for receiving a radio resource control (RRC) message indicating the configuration.

In some examples of the method, apparatuses, and non-transitory computer-readable medium described herein, the uplink message includes an uplink data packet or a sounding reference signal (SRS) or both.

A method for wireless communications at a base station is described. The method may include transmitting, to a UE, a configuration for a set of configured reference signals for path-loss estimation at the UE, updating a reference signal of the set of configured reference signals for the path-loss estimation, transmitting, to the UE, the updated reference signal, and receiving, from the UE, an uplink message transmitted with an uplink transmit power based on a path-loss measurement for the updated reference signal.

An apparatus for wireless communications at a base station is described. The apparatus may include a processor and memory coupled to the processor, where the processor and memory are configured to transmit, to a UE, a configuration for a set of configured reference signals for path-loss estimation at the UE, update a reference signal of the set of configured reference signals for the path-loss estimation, transmit, to the UE, the updated reference signal, and receive, from the UE, an uplink message transmitted with an uplink transmit power based on a path-loss measurement for the updated reference signal.

Another apparatus for wireless communications at a base station is described. The apparatus may include means for transmitting, to a UE, a configuration for a set of configured reference signals for path-loss estimation at the UE, updating a reference signal of the set of configured reference signals for the path-loss estimation, transmitting, to the UE, the updated reference signal, and receiving, from the UE, an uplink message transmitted with an uplink transmit power based on a path-loss measurement for the updated reference signal.

A non-transitory computer-readable medium storing code for wireless communications at a base station is described. The code may include instructions executable by a processor to transmit, to a UE, a configuration for a set of configured reference signals for path-loss estimation at the UE, update a reference signal of the set of configured reference signals for the path-loss estimation, transmit, to the UE, the updated reference signal, and receive, from the UE, an uplink message transmitted with an uplink transmit power based on a path-loss measurement for the updated reference signal.

In some examples of the method, apparatuses, and non-transitory computer-readable medium described herein, updating the reference signal may include operations, features, means, or instructions for transmitting, to the UE, a MAC-CE indicating the reference signal.

In some examples of the method, apparatuses, and non-transitory computer-readable medium described herein, updating the reference signal may involve activating the reference signal.

In some examples of the method, apparatuses, and non-transitory computer-readable medium described herein, transmitting the updated reference signal may include operations, features, means, or instructions for transmitting, to the UE, a set of active reference signals corresponding to the updated reference signal following the updating and based on a periodicity of the updated reference signal, where the uplink transmit power may be based on a set of path-loss measurements for the set of active reference signals.

Some examples of the method, apparatuses, and non-transitory computer-readable medium described herein may further include operations, features, means, or instructions for transmitting, to the UE, a deactivated reference signal of the set of configured reference signals.

Some examples of the method, apparatuses, and non-transitory computer-readable medium described herein may further include operations, features, means, or instructions for updating the deactivated reference signal for the path-loss estimation, where the updating the deactivated reference signal may involve activating the deactivated reference signal, and receiving, from the UE, an additional uplink message according to an additional uplink transmit power based on an additional path-loss measurement for the deactivated reference signal.

Some examples of the method, apparatuses, and non-transitory computer-readable medium described herein may further include operations, features, means, or instructions for refraining from transmitting a deactivated reference signal of the set of configured reference signals.

Some examples of the method, apparatuses, and non-transitory computer-readable medium described herein may further include operations, features, means, or instructions for updating an additional reference signal of the set of configured reference signals for the path-loss estimation, where the updating the additional reference signal may involve deactivating the additional reference signal, activating a timer following the deactivating, transmitting, to the UE, the additional reference signal following the deactivating if the timer is running, identifying an expiry of the timer, and refraining from transmitting the additional reference signal following the deactivating if the timer is inactive.

Some examples of the method, apparatuses, and non-transitory computer-readable medium described herein may further include operations, features, means, or instructions for updating a set of reference signals of the set of configured reference signals for a set of path-loss estimations corresponding to a set of communication beams, where the updating the set of reference signals may involve activating the set of reference signals.

In some examples of the method, apparatuses, and non-transitory computer-readable medium described herein, a number of reference signals in the set of activated references signals may be less than or equal to a number of reference signals in the set of configured reference signals.

Some examples of the method, apparatuses, and non-transitory computer-readable medium described herein may further include operations, features, means, or instructions for receiving, from the UE, an indication of a UE beamforming capability and determining the configuration based on the UE beamforming capability.

In some examples of the method, apparatuses, and non-transitory computer-readable medium described herein, transmitting the configuration may include operations, features, means, or instructions for transmitting an RRC message indicating the configuration.

In some examples of the method, apparatuses, and non-transitory computer-readable medium described herein, the uplink message includes an uplink data packet or an SRS or both.

A method for wireless communications at a UE is described. The method may include receiving, from a base station, a MAC-CE updating a first reference signal, determining, from a set of configured reference signals, a second reference signal to use for path-loss estimation based on the updated first reference signal, calculating a path-loss estimate using the determined second reference signal, and transmitting an uplink message according to an uplink transmit power based on the path-loss estimate.

An apparatus for wireless communications at a UE is described. The apparatus may include a processor and memory coupled to the processor, the processor and memory configured to receive, from a base station, a MAC-CE updating a first reference signal, determine, from a set of configured reference signals, a second reference signal to use for path-loss estimation based on the updated first reference signal, calculate a path-loss estimate using the determined second reference signal, and transmit an uplink message according to an uplink transmit power based on the path-loss estimate.

Another apparatus for wireless communications at a UE is described. The apparatus may include means for receiving, from a base station, a MAC-CE updating a first reference signal, determining, from a set of configured reference signals, a second reference signal to use for path-loss estimation based on the updated first reference signal, calculating a path-loss estimate using the determined second reference signal, and transmitting an uplink message according to an uplink transmit power based on the path-loss estimate.

A non-transitory computer-readable medium storing code for wireless communications at a UE is described. The code may include instructions executable by a processor to receive, from a base station, a MAC-CE updating a first reference signal, determine, from a set of configured reference signals, a second reference signal to use for path-loss estimation based on the updated first reference signal, calculate a path-loss estimate using the determined second reference signal, and transmit an uplink message according to an uplink transmit power based on the path-loss estimate.

In some examples of the method, apparatuses, and non-transitory computer-readable medium described herein, the MAC-CE may activate the first reference signal and the first reference signal may be the same as the second reference signal, or the MAC-CE may deactivate the first reference signal and the first reference signal may be different from the second reference signal.

DETAILED DESCRIPTION

Figure 1:
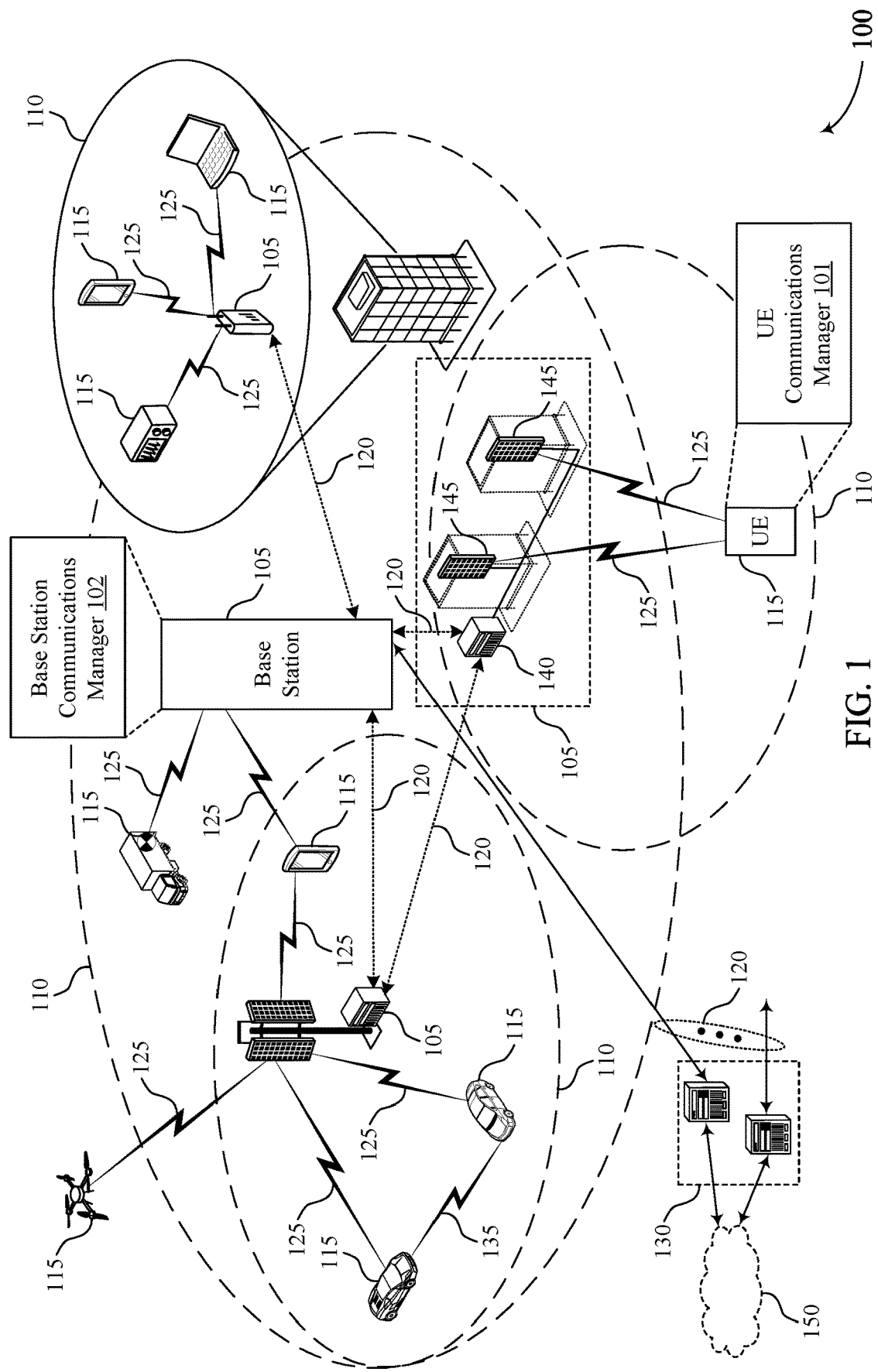
FIGS. 1 through 3 illustrate examples of wireless communications systems that support path-loss estimation using path-loss reference signal activation and deactivation in accordance with one or more aspects of the present disclosure.

In wireless communications systems, over-the-air (OTA) transmissions may experience signal power attenuation due to one or more factors. To account for this signal power attenuation, a UE may perform path-loss estimation for a particular channel. For example, a base station may configure the UE with a set of reference signals to use for path-loss estimation. The UE may receive a path-loss reference signal and may determine a path-loss estimate based on the reference signal received power (RSRP) of the path-loss reference signal (e.g., as compared to a reference signal transmit power used by the base station). The UE may select an uplink transmit power based on this path-loss estimate (e.g., among other uplink transmit power control parameters) for uplink transmissions on the particular channel.

However, in some cases, the channel for transmissions may frequently change. For example, if the UE and base station implement beamforming techniques, a change in the beam pair used by the UE and base station may change the path-loss associated with transmissions. In some cases, the UE may be capable of (or may implement) tracking path-loss estimates for a subset of all of the possible beam pairs (e.g., due to the number of combinations, the available channel overhead, the available processing capacity, etc.). To support such tracking, the base station may activate specific reference signals for path-loss estimation and may deactivate other reference signals for path-loss estimation. In some cases, activating and deactivating reference signals for path-loss estimation may be referred to as updating reference signals. For example, the base station may update (e.g., activate or deactivate) specific path-loss reference signals at the UE using a MAC-CE. The UE may implement one or more techniques for handling path-loss estimation using path-loss reference signal activation and deactivation.

In some cases, the UE may filter (e.g., average) path-loss measurements across a number of received path-loss reference signals to determine a path-loss estimate. For example, the UE may be configured with a time duration for filtering path-loss measurements. During the time duration, the UE may receive multiple repetitions of a path-loss reference signal (e.g., according to a periodicity or schedule of the path-loss reference signal) and may filter the path-loss measurements to determine an accurate path-loss estimate over time (e.g., robust to bursty interference in the system). In some other cases, the UE may use a single, unfiltered path-loss reference signal measurement for path-loss estimation (e.g., for low latency estimation). In some examples, the UE may track (e.g., receive, filter, or both) deactivated path-loss reference signals. In some other examples, the UE may not track deactivated path-loss reference signals. In yet other examples, the UE may track deactivated path-loss reference signals for a set duration of time after deactivation (e.g., according to a timer) and then may stop tracking the deactivated path-loss reference signals. In some cases, the base station may configure the UE with a number of configured path-loss reference signals greater than a number of activated path-loss reference signals (e.g., based on a maximum number of activated path-loss reference signals supported by the UE). In some other cases, the base station may configure the UE with a number of configured path-loss reference signals equal to the number of activated path-loss reference signals. A path-loss reference signal may be "active" from the UE's perspective if the UE measures the receive signal properties of the path-loss reference signal in order to estimate a path-loss that can be used in an uplink power control algorithm. A path-loss reference signal may be "inactive" or "deactivated" from the UE's perspective if the UE does not perform path-loss estimation based on the path-loss reference signal.

Aspects of the disclosure are initially described in the context of wireless communications systems. Aspects of the disclosure are further illustrated by and described with reference to process flows, apparatus diagrams, system diagrams, and flowcharts that relate to path-loss estimation using path-loss reference signal updating (e.g., activation and deactivation).

FIG. 1 illustrates an example of a wireless communications system 100 that supports path-loss estimation using path-loss reference signal activation and deactivation in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_{max}$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

In some wireless communications systems 100, a UE 115 may perform path-loss estimation to support power control for uplink transmissions. A base station 105 may transmit one or more reference signals to the UE 115 for path-loss estimation, and the UE 115 may receive the reference signals, measure the received powers, and determine path-loss estimates based on these received powers. The UE 115 may use a determined path-loss estimate when determining an uplink transmit power for uplink transmission.

In some cases, a base station 105 may update path-loss reference signals for power control (e.g., for physical uplink shared channel (PUSCH) transmissions, SRS transmissions, etc.) via MAC-CE. In a first example, for codebook-based PUSCH transmission, a path-loss reference signal may be derived from a downlink reference signal in the spatial relation associated with the SRS resource indicator (SRI) indicated in a scheduling downlink control information (DCI) message (e.g., if the path-loss reference signal is not configured but periodic downlink reference signals are configured in the spatial relation of the SRS). In a second example, the base station 105 may configure a path-loss reference signal to be a downlink reference signal in a spatial relation information configuration. In a third example, the base station 105 may update (e.g., activate, deactivate, or both) at least the path-loss reference signals for PUSCH, SRS, or both using the MAC-CE. In some cases, the base station 105 may additionally update (e.g., activate, deactivate, or both) other power control parameters (e.g., P0, alpha, a closed loop process index, etc.) by the MAC-CE. For example, the base station 105 may use the SRS activation MAC-CE for activating SRS power control parameters. In a fourth example, the base station 105 may update transmission configuration indication (TCI) states for periodic CSI-RSs using the MAC-CE, where the periodic CSI-RSs may be used for path-loss reference. In a fifth example, the base station 105 may support semi-persistent CSI-RSs for path-loss reference.

Using one or more of the techniques described herein, a base station 105 may update (e.g., activate) path-loss reference signals for a UE 115. For example, the base station 105 may configure a set of path-loss reference signals, where a first subset of the configured path-loss reference signals are "active" and a second subset of the configured path-loss reference signals are "inactive." The UE 115 may measure path-loss using activated path-loss reference signals according to one or more of the techniques described herein. Additionally or alternatively, the UE 115 may handle deactivated path-loss reference signals according to one or more of the techniques described herein.

Specifically, a UE 115 may receive, from a base station 105, a configuration for a set of reference signals for path-loss estimation, determine, from the set of configured reference signals, a reference signal to use for the path-loss estimation, calculate a path-loss estimate using the determined reference signal, and transmit an uplink message (to the base station 105) according to an uplink transmit power based on the path-loss estimate. One or more of these operations may be performed by a UE communications manager 101, which may be an example of a communications manager 515, 615, 705, or 810 as described with reference to FIGS. 5 through 8. In some cases, a transceiver may perform the receiving and transmitting operations and a transmit power controller may determine the path-loss estimate and modify the uplink transmit power based on the path-loss estimate.

Correspondingly, a base station 105 may transmit a configuration for a set of reference signals for path-loss estimation at a UE 115, update (e.g., activate) a reference signal of the set of configured reference signals for the path-loss estimation, transmit, to the UE 115, the updated (e.g., activated) reference signal, and receive, from the UE 115, an uplink message transmitted with an uplink transmit power based on a path-loss measurement for the updated (e.g., activated) reference signal. One or more of these operations may be performed by a base station communications manager 102, which may be an example of a communications manager 915, 1015, 1105, or 1210 as described with reference to FIGS. 9 through 12. In some cases, a transceiver may perform the receiving and transmitting operations, a scheduler may determine the configuration, and an antenna controller may determine the reference signals to activate, deactivate, or both (e.g., based on one or more communication beams).

Figure 2:
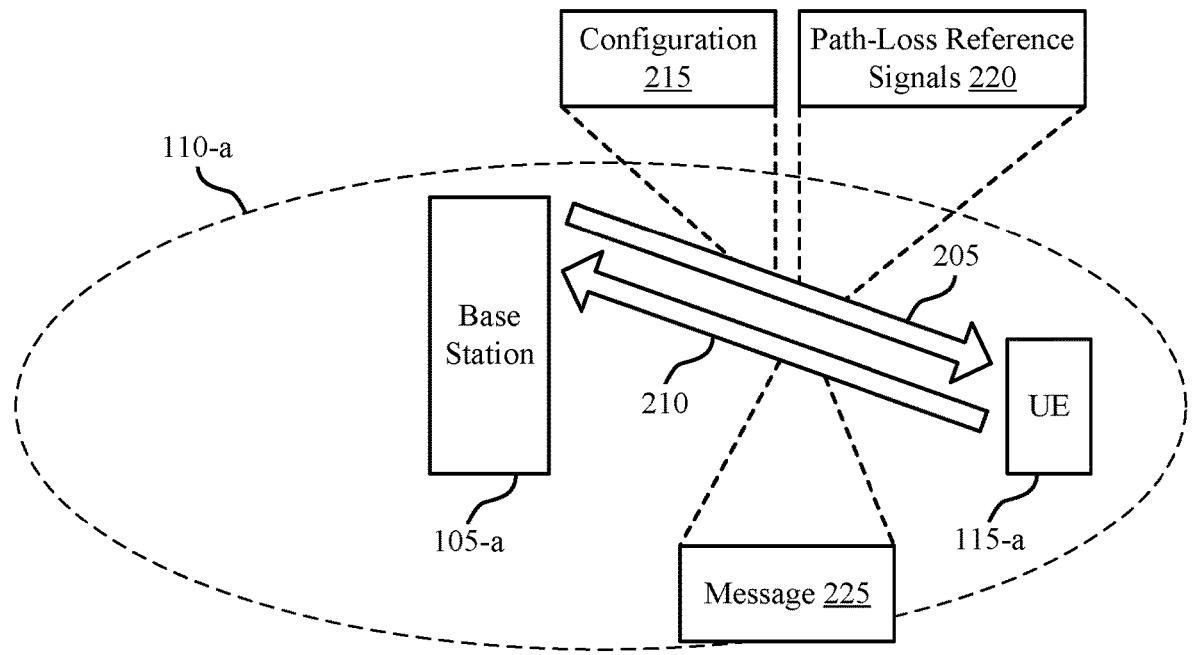

FIG. 2 illustrates an example of a wireless communications system 200 that supports path-loss estimation using path-loss reference signal activation and deactivation in accordance with one or more aspects of the present disclosure. The wireless communications system 200 may be an example of a wireless communications system 100. The wireless communications system 200 may include base station 105-a and UE 115-a, which may be examples of the corresponding wireless devices as described with reference to FIG. 1. Base station 105-a may provide network coverage for a geographic coverage area 110-a. Based on one or more path-loss reference signals 220 transmitted on a downlink channel 205, UE 115-a may perform path-loss estimation to determine an uplink transmit power for transmitting uplink messages 225 on an uplink channel 210. In some cases, UE 115-a may support the updating (e.g., activation and deactivation) of path-loss reference signals for improved transmit power control.

In OTA communications, path-loss refers to the attenuation of a signal's power due to one or more affects. For example, free-space loss, obstructions, propagation distance, refraction/diffraction/reflection, or any combination of these or other relevant effects may result in path-loss. When selecting a transmit power to use for transmissions, a wireless device may estimate the path-loss in order to accurately determine the corresponding receive power at a receiving wireless device. Basing transmit power control at least in part on path-loss estimation may improve the reliability of signal reception.

In systems implementing beamforming, the path-loss may depend on the active beam pair used for communications. For example, different beam pairs may result in different signal paths with different path-loss values. To estimate path-loss, a wireless device may receive a path-loss reference signal 220 over a beam pair. For example, to measure an uplink path-loss, a UE 115, such as UE 115-a may receive a path-loss reference signal 220 from a base station 105, such as base station 105-a. The base station 105-a may transmit the path-loss reference signal 220 using a downlink transmit beam of a beam pair and the UE 115-a may receive the path-loss reference signal 220 using a downlink receive beam of the beam pair. This beam pair may correspond to a similar or related uplink beam pair. For example, the path-loss reference signal 220 may indicate path-loss information for an uplink transmit beam at UE 115-a and an uplink receive beam at base station 105-a. The uplink transmit beam and downlink receive beam at UE 115-a may have the same or similar (e.g., within a threshold difference) beam directions, beam widths, or both. In some cases, the downlink receive beam may be a relatively wide beam (e.g., compared to the uplink transmit beam), and UE 115-a may select an uplink transmit beam encompassed within the beam width of the downlink receive beam. The uplink receive beam and downlink transmit beam at base station 105-a may also be similar or the same communication beam.

Base station 105-a may transmit the path-loss reference signal 220 using a default transmit power known to both base station 105-a and UE 115-a. UE 115-a may receive the path-loss reference signal 220 and may estimate the path-loss for the corresponding uplink beam pair based on the RSRP (or a similar metric) for the path-loss reference signal. That is, by comparing the measured RSRP to the transmit power used by base station 105-a, UE 115-a may determine the path-loss experienced by the path-loss reference signal 220. The path-loss reference signal 220 may be an example of a CSI-RS, a synchronization signal block (SSB), or any other downlink reference signal. UE 115-a may use the measured path-loss estimate (among other parameters) for uplink transmit power control. For example, based on the path-loss estimate, UE 115-a may select a transmit power and may transmit an uplink message 225 to base station 105-a using the selected transmit power. The uplink message 225 may be an example of an uplink data message, such as a PUSCH message, an uplink control message, such as a physical uplink control channel (PUCCH) message, an SRS, or any other uplink message 225.

Base station 105-a may configure UE 115-a with a set of path-loss reference signals using a configuration 215. In some cases, base station 105-a may transmit the configuration 215 in an RRC message. For example, during RRC configuration, base station 105-a may indicate to UE 115-a the time resources, frequency resources, or both (e.g., a particular physical resource block (PRB)) for UE 115-a to receive reference signals and measure the path-loss for these reference signals. Such reference signals may be referred to as path-loss reference signals or configured path-loss reference signals.

In some cases, base station 105-a may update the path-loss reference signals for UE 115-a. For example, in systems implementing beamforming (e.g., systems supporting millimeter wave (mmW) communications), each beam change at base station 105-a, UE 115-a, or both may result in changes to the channel (and, correspondingly, changes in the path-loss). Each path-loss reference signal may correspond to a particular beam pair between UE 115-a and base station 105-a. Accordingly, changes to the selected beam pair for communications may result in changes to a corresponding reference signal for path-loss estimation. However, using RRC signaling to update one or more path-loss reference signals may introduce significant latency (e.g., processing latency at UE 115-a) in order to update the path-loss reference signals. Instead, base station 105-a may use a MAC-CE to change the path-loss reference signals. For example, base station 105-a may transmit a MAC-CE to UE 115-a indicating the changes to the path-loss reference signals, and UE 115-a may process the MAC-CE and identify the changes with a shorter processing latency (as compared to processing an RRC message). For example, processing a MAC-CE may take up to three milliseconds, while processing an RRC message may take tens of milliseconds. Using the MAC-CE, base station 105-a may make low-latency updates to the path-loss reference signals, allowing UE 115-a to measure the path-loss for a different beam pair and determine an updated uplink transmit power for transmission over the different beam pair without significant latency.

Updating the path-loss reference signals may involve activating and/or deactivating particular reference signals for path-loss estimation of the configured path-loss reference signals, modifying the configured set of path-loss reference signals, or some combination thereof. For example, UE 115-a may store an indicator (e.g., a variable) in memory indicating one or more active path-loss reference signals (e.g., identifiers for the path-loss reference signals for UE 115-a to track). When base station 105-a updates the path-loss reference signals using the MAC-CE, UE 115-a may update the indicator (e.g., variable) in memory to indicate one or more updated active path-loss reference signals. In this way, base station 105-a and UE 115-a may update the path-loss reference signals using the MAC-CE.

In a first example, the configuration 215 may configure a full set of path-loss reference signals for UE 115-a (e.g., up to sixty-four path-loss reference signals, or some other number), where a subset of the configured reference signals (e.g., up to four path-loss reference signals, or some other number) are active. That is, in some cases, the number of configured path-loss reference signals for UE 115-a may be more than a number of active (e.g., a maximum number of selected and/or activated) path-loss reference signals. Having more configured path-loss reference signals than active path-loss reference signals may support more accurate path-loss estimation. In some other cases, the number of configured path-loss reference signals for UE 115-a may be equal to the number of active path-loss reference signals, which may support a low signaling and processing overhead (e.g., as activation/deactivation may not be used). Base station 105-a may transmit the active path-loss reference signals and UE 115-a may receive the active path-loss reference signals to determine path-loss estimations for the corresponding beam pairs. Base station 105-a may transmit a MAC-CE (or some other message) to activate particular reference signals and deactivate other reference signals for path-loss estimation. For example, UE 115-a may receive the MAC-CE and may "activate" particular reference signals (e.g., identify that the references signals are active for path-loss estimation and receive these active path-loss reference signals). In a second example, the configuration 215 may configure an active set of path-loss reference signals, and base station 105-a may update the configured active set of path-loss reference signals using a MAC-CE (or some other message). The MAC-CE may indicate reference signal identifiers (e.g., indexes for reference signals to activate, reference signals to deactivate, or both) or may indicate particular resources (e.g., time and frequency resources) for updated reference signals.

In some cases, UE 115-a may measure path-loss using multiple repetitions of an active path-loss reference signal 220. For example, base station 105-a may repeatedly transmit a path-loss reference signal 220 according to a periodicity or schedule. UE 115-a may receive multiple repetitions of the path-loss reference signal 220 (i.e., multiple reference signals corresponding to the same path-loss reference signal 220 according to a periodicity or schedule) and may perform an averaging technique across the multiple repetitions to determine a path-loss estimate. For example, UE 115-a may use L3 filtering on the path-loss estimates for a set of reference signal repetitions corresponding to a path-loss reference signal 220. The averaging technique may, in some examples, calculate a single path-loss estimate using a set of measured path-loss values for a set of received path-loss reference signals 220, where more recent path-loss values may or may not be emphasized in the calculations. UE 115-a may perform the averaging technique over a particular time duration, over a particular number of reference signal repetitions, or a combination thereof. In some cases, the particular time duration, particular number of repetitions, or both may be pre-configured at UE 115-a or may be configured by base station 105-a. Additionally or alternatively, the particular time duration for time averaging path-loss estimates may depend on the frequency and/or schedule of path-loss reference signal transmissions by base station 105-a. UE 115-a may implement uplink transmit power control using the averaged (e.g., L3 filtered) path-loss estimates of an activated path-loss reference signal for uplink message 225 transmission. By performing an averaging technique, UE 115-a may determine a stable and accurate path-loss estimation, as averaging mitigates the effects of interference (e.g., bursty interference) on the path-loss measurements.

In some other cases, UE 115-a may measure a single path-loss reference signal 220 and may use the single path-loss measurement for path-loss estimation. In some examples, using a single path-loss reference signal 220 may be referred to as using an unfiltered path-loss value for transmit power control. Using a single path-loss reference signal 220 may reduce the processing overhead at UE 115-a (e.g., as opposed to performing L3 filtering for path-loss estimation). In some cases, using a single path-loss reference signal 220 may support low latency processing and transmission, as UE 115-a may determine a path-loss estimate for an uplink beam pair based on receiving a single path-loss reference signal 220 (e.g., rather than converging on a path-loss estimate after receiving multiple path-loss reference signals 220 for filtering).

UE 115-a may be configured with a process for handling deactivated path-loss reference signals. UE 115-a may be pre-configured or configured by base station 105-a with the process for handling deactivated path-loss reference signals. In some cases, UE 115-a may track and/or filter deactivated path-loss reference signals 220. For example, base station 105-a may transmit deactivated path-loss reference signals 220, and UE 115-a may receive these deactivated path-loss reference signals 220 and calculate one or more path-loss estimates. Tracking deactivated path-loss reference signals 220 may support low-latency transmission updates when switching between beam pairs. For example, if UE 115-a switches a beam pair (and a corresponding active path-loss reference signal), UE 115-a may have maintained path-loss measurements for this path-loss reference signal, so UE 115-a may accurately determine uplink transmit power (e.g., without waiting some specific duration following activation for convergence of a path-loss estimate).

In some other cases, UE 115-a may not track and/or filter deactivated path-loss reference signals 220. For example, base station 105-a may refrain from transmitting deactivated path-loss reference signals, and UE 115-a may additionally or alternatively refrain from monitoring for the deactivated path-loss reference signals. Not transmitting and tracking deactivated path-loss references signals may reduce signaling overhead on the downlink channel 205 and may reduce processing overhead for the wireless devices (e.g., especially UE 115-a).

In yet some other cases, UE 115-a may track and/or filter deactivated path-loss reference signals 220 for a set amount of time (or a set number of reference signals) after deactivating the path-loss reference signals. For example, upon deactivating a path-loss reference signal (e.g., upon receiving an indication from base station 105-a that a path-loss reference signal is deactivated), UE 115-a may start a timer. In some cases, base station 105-a may start a corresponding timer. While the timer is running, base station 105-a may continue transmitting the deactivated path-loss reference signal (e.g., according to some periodicity or schedule) and UE 115-a may continue receiving the deactivated path-loss reference signal and calculating a path-loss estimate. In some cases, if the deactivated path-loss reference signal is re-activated (e.g., the corresponding beam pair is re-selected) while the timer is running, UE 115-a may use the maintained path-loss estimate for uplink transmit power control. The length of the timer may be configured by base station 105-a or pre-configured at UE 115-a. When the timer expires, base station 105-a may stop transmitting the deactivated path-loss reference signal and UE 115-a may stop monitoring for the deactivated path-loss reference signal.

In some examples, UE 115-a may store a path-loss estimate when deactivating a path-loss reference signal. For example, upon receiving an indication that a path-loss reference signal is deactivated (e.g., in a MAC-CE), UE 115-a may store a latest path-loss estimate in memory for the path-loss reference signal. Additionally, UE 115-a may store an indication of the corresponding path-loss reference signal, beam pair, or both for the path-loss estimate. If the path-loss reference signal is re-activated, UE 115-a may initially use the stored path-loss estimate for uplink transmit power control. UE 115-a may further update the path-loss estimate using the re-activated path-loss reference signals.

Figure 3:
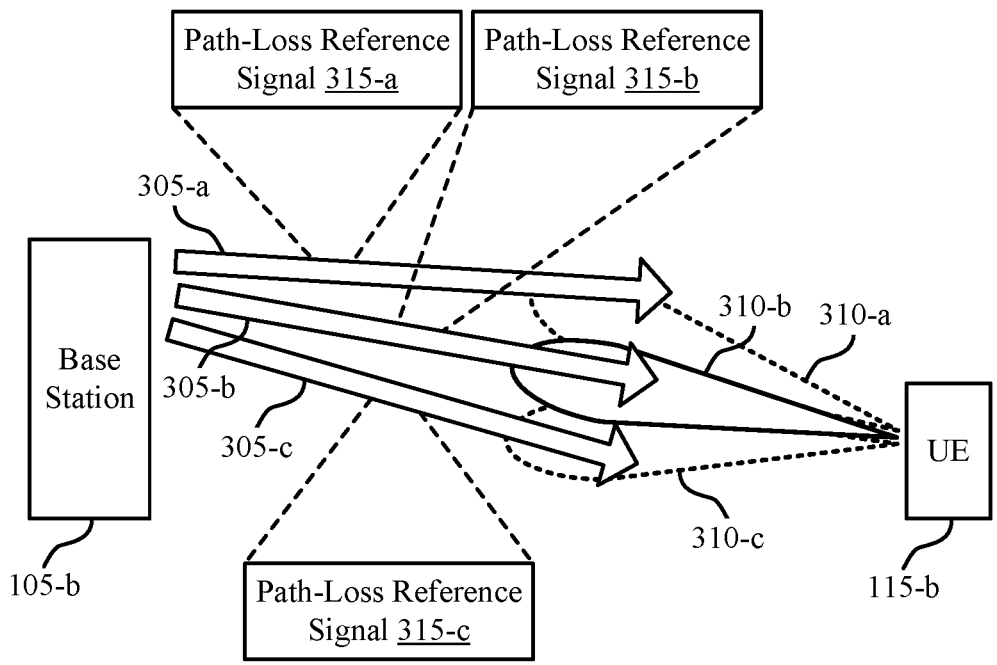

FIG. 3 illustrates an example of a wireless communications system 300 that supports path-loss estimation using path-loss reference signal activation and deactivation in accordance with one or more aspects of the present disclosure. The wireless communications system 300 may be an example of a wireless communications system 100 or 200 as described herein. The wireless communications system 300 may include base station 105-b and UE 115-b, which may be examples of the corresponding wireless devices as described with reference to FIGS. 1 and 2. Base station 105-b and UE 115-b may implement beamforming techniques for communications. For example, UE 115-b may communicate with base station 105-b using communication beams 310, which may be examples of uplink transmit beams, downlink receive beams, or both. Base station 105-b may also communicate with UE 115-b using communication beams (not shown). For example, base station 105-b may send transmissions 305-a using a first communication beam (e.g., a first downlink transmit beam), send transmissions 305-b using a second communication beam (e.g., a second downlink transmit beam), and send transmissions 305-c using a third communication beam (e.g., a third downlink transmit beam).

Base station 105-b may configure UE 115-b with a set of path-loss reference signals (e.g., using RRC signaling). Additionally or alternatively, base station 105-b may update the set of path-loss reference signals for UE 115-b (e.g., using MAC-CE signaling). For example, base station 105-b may configure a set of reference signals and may activate particular reference signals of the set of reference signals for path-loss estimation. In some cases, based on changes in the channel, the UE's positioning, etc., base station 105-*b* may activate different path-loss reference signals to support path-loss estimation for different beam pairs. For example, base station 105-*b* may activate path-loss reference signal 315-*a* if UE 115-*b* is transmitting using communication beam 310-*a*, activate path-loss reference signal 315-*b* if UE 115-*b* is transmitting using communication beam 310-*b*, and activate path-loss reference signal 315-*c* if UE 115-*c* is transmitting using communication beam 310-*c*.

In some cases, base station 105-*b* may activate a first set of path-loss reference signals 315 and may deactivate a second set of path-loss reference signals 315. The number of active path-loss reference signals 315 (or the number of configured path-loss reference signals 315) may be based on a UE's beamforming capabilities, a UE's antenna configuration, or both. For example, a UE 115-*b* supporting lower beam capabilities (e.g., a lower number of communication beams 310, wider beams, etc.) may be configured with fewer path-loss reference signals 315 corresponding to the lower beam capabilities. In some cases, UE 115-*b* may transmit an indication of the UE's beam capabilities to base station 105-*b*, and base station 105-*b* may configure UE 115-*b* with path-loss reference signals 315 (e.g., configured path-loss reference signals, active path-loss reference signals, etc.) based on the UE's beam capabilities. A greater number of configured path-loss reference signals 315 may correspond to finer communication beams 310 at UE 115-*b*, resulting in more accurate path-loss estimations. In some cases, base station 105-*b* may determine a number of path-loss reference signals 315 to configure based on a tradeoff between path-loss accuracy and signaling overhead/complexity.

In some cases, UE 115-*b* may support a number of configured communication beams 310 concurrently based on the UE's antenna configuration. For example, if UE 115-*b* has two antenna arrays (e.g., two panels), UE 115-*b* may support two communication beams 310 concurrently. Accordingly, base station 105-*b* may configure UE 115-*b* with two active path-loss reference signals 315 at a time (e.g., one path-loss reference signal 315 per antenna array, per communication beam 310, etc.). However, base station 105-*b* may configure UE 115-*b* with greater than two path-loss reference signals 315 (e.g., potential reference signals that may be used for path-loss estimations), such as four, eight, etc. configured path-loss reference signals 315. Base station 105-*b* may switch between the configured path-loss reference signals (e.g., using MAC-CEs to update, such as activate and/or deactivate, different path-loss reference signals) for improved path-loss estimation. Different configured path-loss reference signals 315 may correspond to different communication beams 310 at UE 115-*b*. Additionally or alternatively, multiple configured path-loss reference signals 315 may correspond to a same communication beam 310 at UE 115-*b*. For example, base station 105-*b* may activate and/or deactivate particular path-loss reference signals 315 all indicating path-loss for a same communication beam 310-*a* at UE 115-*b* to support accurate path-loss estimation.

In some examples, base station 105-*b* may configure UE 115-*b* with path-loss reference signals 315-*a*, 315-*b*, and 315-*c*. However, UE 115-*b* may support two active path-loss reference signals 315-*n* some cases, base station 105-*b* may activate path-loss reference signals 315-*a* and 315-*b* (e.g., using an indication in a MAC-CE). Base station 105-*b* may transmit active path-loss reference signals 315-*a* and 315-*b* to UE 115-*b* using the configured resources and periodicities for the reference signals. UE 115-*b* may receive the active path-loss reference signals 315-*a* and 315-*b* and may calculate path-loss estimates for corresponding communication beams 310-*a* and 310-*b*. In some cases, UE 115-*b* may measure a path-loss value for a single path-loss reference signal 315 and may use the path-loss value as the path-loss estimate for uplink transmit power control. In some other cases, UE 115-*b* may measure multiple repetitions of a path-loss reference signal 315 and may converge on a path-loss estimate based on filtering (e.g., averaging) the multiple repetitions. UE 115-*b* may determine uplink transmit powers for communication beams 310-*a* and 310-*b* based on measuring the active path-loss reference signals 315-*a* and 315-*b*.

At a subsequent time, base station 105-*b* may update the path-loss reference signals 315. For example, base station 105-*b* may update (e.g., activate) path-loss reference signal 315-*c* and update (e.g., deactivate) path-loss reference signal 315-*a*. For example, UE 115-*b* may switch to using communication beam 310-*c* for uplink transmissions (e.g., based on UE 115-*b* moving within the cell served by base station 105-*b*).

In a first example, while path-loss reference signals 315 are deactivated, UE 115-*b* may continue tracking and/or filtering the deactivated path-loss reference signals 315. For example, prior to activation, base station 105-*b* may transmit path-loss reference signal 315-*c* and UE 115-*b* may receive path-loss reference signal 315-*c* (e.g., using a different communication beam 310-*c* or using a same communication beam 310, such as communication beam 310-*b*). If this tracking of path-loss reference signal 315-*c* is maintained, when base station 105-*b* activates path-loss reference signal 315-*c*, UE 115-*b* may have a stored path-loss estimate for path-loss reference signal 315-*c* (due to the continued tracking). In this way, if UE 115-*b* implements filtering across a time duration for accurate path-loss estimation, UE 115-*b* may converge on a path-loss estimate based on the path-loss measurements made prior to activating the path-loss reference signal 315-*c*. UE 115-*b* may determine an accurate uplink transmit power based on the path-loss estimate following activation of path-loss reference signal 315-*c* (e.g., without additionally waiting the time duration to converge on a path-loss estimate following path-loss reference signal 315-*c* activation). Accordingly, maintaining tracking and/or filtering for deactivated path-loss reference signals 315 may support low latency switching of path-loss reference signals 315, communication beams 310, or both for uplink transmissions.

In a second example, while path-loss reference signals 315 are deactivated, UE 115-*b* may refrain from tracking and/or filtering the deactivated path-loss reference signals 315. For example, base station 105-*b* may not transmit path-loss reference signal 315-*c* prior to activating path-loss reference signal 315-*c*. Alternatively, base station 105-*b* may transmit path-loss reference signal 315-*c* prior to activating path-loss reference signal 315-*c* at UE 115-*b*, but UE 115-*b* may not track deactivated path-loss reference signal 315-*c*. Refraining from tracking deactivated path-loss reference signals 315 may reduce signaling and processing overhead, as base station 105-*b* may refrain from transmitting deactivated path-loss reference signals 315, UE 115-*b* may refrain from processing deactivated path-loss reference signals 315, or both. If UE 115-*b* implements filtering across a time duration for accurate path-loss estimation, UE 115-*b* may converge on a path-loss estimate following path-loss reference signal 315-*c* activation and the additional time duration. In some cases, to support low latency transmissions following path-loss reference signal 315-c activation, UE 115-b may use unfiltered path-loss values for uplink transmit power control prior to convergence, and then may use the path-loss estimate converged on by UE 115-b for uplink transmit power control (e.g., using the filtered path-loss values across the time duration). In some cases, UE 115-b may select whether to implement filtering based on a periodicity or schedule of path-loss reference signal 315 transmissions. For example, UE 115-b may use filtering for relatively frequent path-loss reference signal 315 transmissions (e.g., greater than a threshold frequency), and may not use filtering for relatively infrequent path-loss reference signal 315 transmissions (e.g., less frequent than the threshold frequency). Additionally or alternatively, UE 115-b may select a time duration for filtering based on the frequency of the path-loss reference signal 315 transmissions.

In a third example, base station 105-b and UE 115-b may use a timer to maintain tracking and/or filtering of deactivated path-loss reference signals 315 for a set duration of time. For example, upon activating path-loss reference signal 315-c and deactivating path-loss reference signal 315-a, base station 105-b and UE 115-b may start running timers. While the timers are running, base station 105-b may transmit path-loss reference signal 315-a and UE 115-b may receive path-loss reference signal 315-a. If base station 105-b re-activates path-loss reference signal 315-a prior to the timer expiring, UE 115-b may maintain path-loss information and may efficiently converge on a path-loss estimate for path-loss reference signal 315-a. However, if the timer expires, base station 105-b may stop transmitting deactivated path-loss reference signal 315-a and UE 115-b may stop receiving deactivated path-loss reference signal 315-a (e.g., to reduce signaling and processing overhead).

In some systems, base station 105-b, UE 115-b, or both may use decision metrics to determine which deactivated path-loss reference signals 315 to track. For example, based on activated path-loss reference signals 315, active communication beams 310, or both UE 115-b may determine deactivated path-loss reference signals 315 for which to maintain path-loss estimates. For example, UE 115-b may track and/or filter deactivated path-loss reference signals 315 for communication beams (e.g., downlink transmit beams, uplink receive beams, or both) spatially similar to the active communication beams (e.g., downlink transmit beams, uplink receive beams, or both), and otherwise may refrain from tracking deactivated path-loss reference signals 315. The decision metrics may be based on beam directions, beam widths, UE mobility, historical communication information, or any combination of these or other communication parameters.

Figure 4:
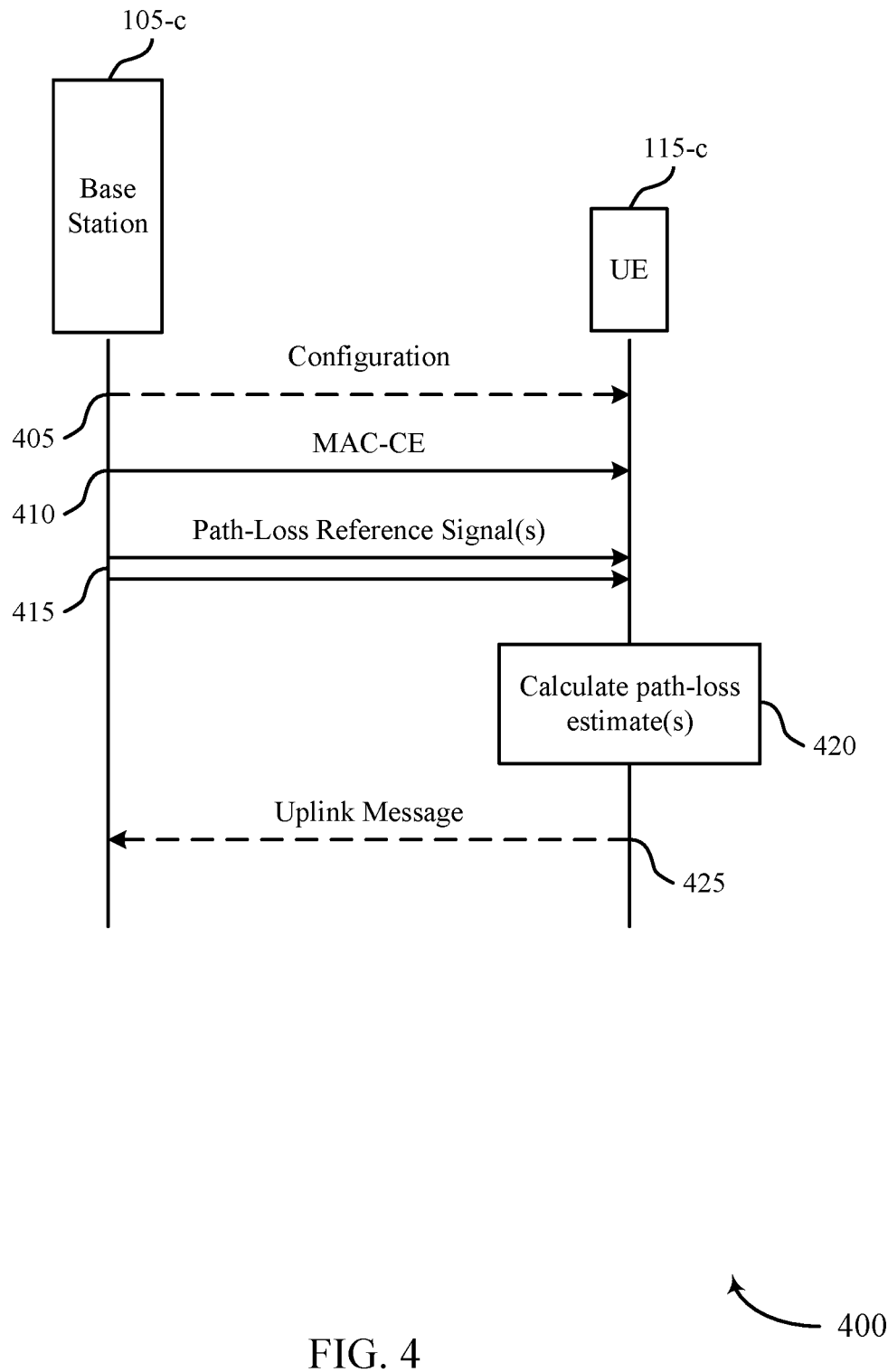
FIG. 4 illustrates an example of a process flow that supports path-loss estimation using path-loss reference signal activation and deactivation in accordance with one or more aspects of the present disclosure.

FIG. 4 illustrates an example of a process flow 400 that supports path-loss estimation using path-loss reference signal activation and deactivation in accordance with one or more aspects of the present disclosure. The process flow 400 may include base station 105-c and UE 115-c, which may be examples of the corresponding wireless devices as described with reference to FIGS. 1 through 3. UE 115-c may calculate a path-loss estimate for uplink transmit power control using active path-loss reference signals. Alternative examples of the following may be implemented, where some processes are performed in a different order than described or are not performed at all. In some cases, processes may include additional features not mentioned below, or further processes may be added.

At 405, base station 105-c may transmit, to UE 115-c, a configuration for a set of reference signals for path-loss estimation at the UE 115-c. Base station 105-c may indicate these configured path-loss reference signals using an RRC message.

At 410, base station 105-c may update (e.g., activate) a reference signal of the set of configured reference signals for path-loss estimation. In some cases, updating the reference signal may involve base station 105-c transmitting a MAC-CE to UE 115-c indicating the reference signal. UE 115-c may determine, from the set of configured reference signals, the reference signal to use for path-loss estimation (e.g., based on the indication of the activated reference signal). In some cases, UE 115-c may determine a set of active reference signals of the configured reference signals to use for path-loss estimations (e.g., corresponding to multiple communication beams). The number of active reference signals may be less than or equal to the number of configured reference signals. In some cases, the number of active reference signals, the number of configured reference signals, or both may be based on a UE capability (e.g., a UE beamforming capability, a UE antenna configuration, etc.) or default values configured at base station 105-c, UE 115-c, or both.

At 415, base station 105-c may transmit, to UE 115-c, one or more reference signals. For example, base station 105-c may transmit the activated reference signal(s) to UE 115-c in the configured resources (e.g., time and frequency resources). Base station 105-c may transmit multiple active reference signals (e.g., multiple repetitions) corresponding to the activated reference signal based on a periodicity (e.g., a schedule) of the activated reference signal. In some cases, base station 105-c may additionally transmit one or more deactivated reference signals to UE 115-c. In some other cases, base station 105-c may refrain from transmitting the deactivated reference signals.

At 420, UE 115-c may calculate a path-loss estimate using the one or more received reference signals. For example, UE 115-c may measure a single path-loss value and use the single path-loss value for the path-loss estimate. In other examples, UE 115-c may measure a set of path-loss values based on receiving a set of active reference signals (e.g., repetitions) corresponding to an activated reference signal and may calculate the path-loss estimate using the multiple measurements (e.g., by performing L3 filtering for a threshold duration, a threshold number of repetitions, or both). In some cases, UE 115-c may track path-estimates for the deactivated reference signals (e.g., if base station 105-c transmits the deactivated reference signals).

At 425, UE 115-c may transmit an uplink message according to an uplink transmit power based on a calculated path-loss estimate (e.g., for an activated path-loss reference signal or signals). Base station 105-c may receive the uplink message. In some cases, the uplink message may be a PUSCH message or an SRS. By performing the path-loss estimate, UE 115-c may account for signal power attenuation between UE 115-c and base station 105-c.

Although described herein with reference to uplink path-loss estimation, it is to be understood that wireless devices may perform similar techniques for other types of path-loss estimation (e.g., downlink path-loss estimation, side-link path-loss estimation, wireless backhaul path-loss estimation, etc.).

Figure 5:
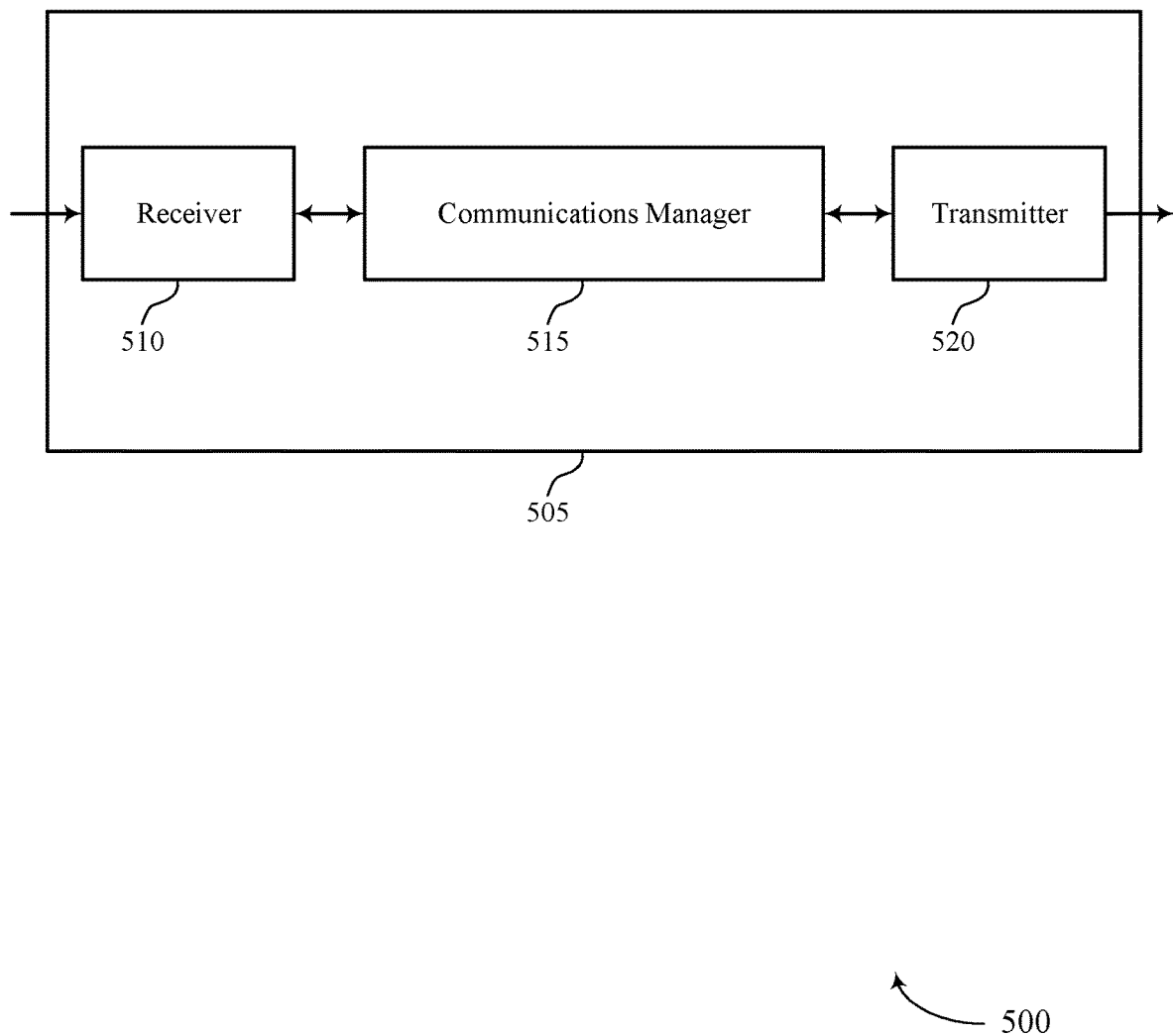
FIGS. 5 and 6 show block diagrams of devices that support path-loss estimation using path-loss reference signal activation and deactivation in accordance with one or more aspects of the present disclosure.

FIG. 5 shows a block diagram 500 of a device 505 that supports path-loss estimation using path-loss reference signal activation and deactivation in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to path-loss estimation using path-loss reference signal activation and deactivation, etc.). Information may be passed on to other components of the device 505. The receiver 510 may be an example of aspects of the transceiver 820 described with reference to FIG. 8. The receiver 510 may utilize a single antenna or a set of antennas.

In some aspects, the communications manager 515 may receive, from a base station, a configuration for a set of configured reference signals for path-loss estimation, determine, from the set of configured reference signals, a reference signal to use for the path-loss estimation, calculate a path-loss estimate using the determined reference signal, and transmit an uplink message according to an uplink transmit power based on the path-loss estimate.

Additionally or alternatively, the communications manager 515 may receive, from a base station, a MAC-CE updating a first reference signal, determine, from a set of configured reference signals, a second reference signal (e.g., the same reference signal or a different reference signal) to use for path-loss estimation based on the updated first reference signal, calculate a path-loss estimate using the determined second reference signal, and transmit an uplink message according to an uplink transmit power based on the path-loss estimate.

The actions performed by the communications manager 515 as described herein may be implemented to realize one or more potential improvements in signaling overhead, signaling latency, or both. For example, determining a reference signal from the set of configured reference signals to use for the path-loss estimation may improve path-loss estimation. For example, determining to perform path-loss estimations for active reference signals (and not for inactive reference signals) may maintain accurate path-loss estimations while improving signaling overhead and processing latency at the UE 115 (e.g., the device 505). Alternatively, performing path-loss estimations for deactivated reference signals may support low-latency switching between beam configurations (e.g., by maintaining path-loss estimates). Performing filtering on path-loss reference signals may support accurate, robust path-loss estimation (e.g., by mitigating the effects of interference), while refraining from performing filtering may support low-latency path-loss estimation (e.g., by determining a path-loss estimate from a single instance of a path-loss reference signal).

Based on determining the reference signal to use for the path-loss estimation, a processor of the UE 115 (e.g., a processor controlling the receiver 510, the communications manager 515, the transmitter 520, etc.) may reduce processing resources used for path-loss estimation (and, correspondingly, transmit power control). For example, the UE 115 may perform path-loss estimations for active reference signals and, in some cases, may refrain from performing path-loss estimations for inactive reference signals. As such, the UE 115 may reduce a number of times the processor ramps up processing power and turns on processing units to handle reference signal reception. Furthermore, reducing the number of active reference signals for path-loss estimation may reduce the signaling overhead on the downlink channel. Additionally, implementing MAC-CEs to activate and deactivate path-loss reference signals (e.g., as opposed to using RRC messaging) may improve the latency involved in activating and deactivating the reference signals.

The communications manager 515 may be an example of aspects of the communications manager 810 described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
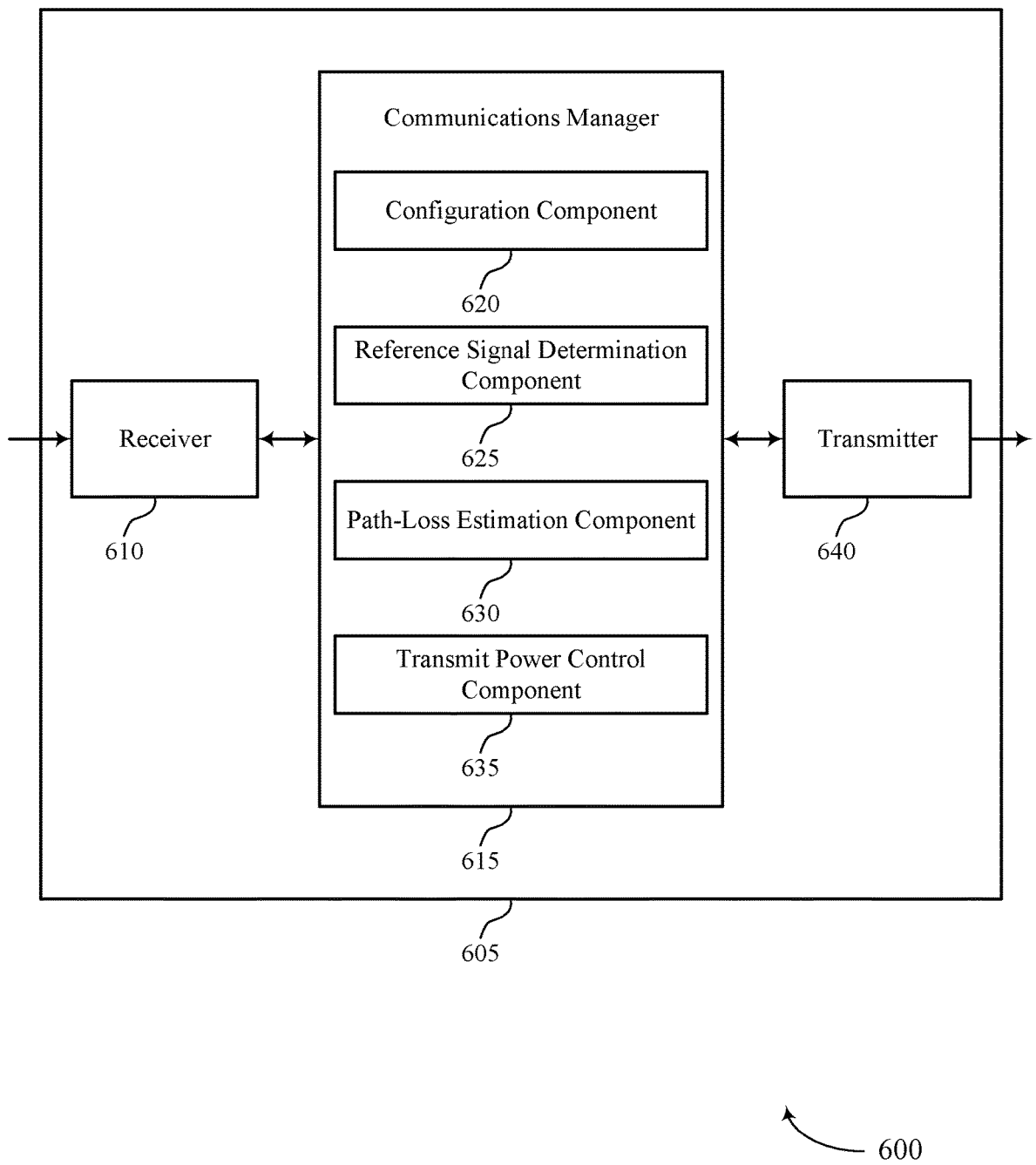

FIG. 6 shows a block diagram 600 of a device 605 that supports path-loss estimation using path-loss reference signal activation and deactivation in accordance with one or more aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to path-loss estimation using path-loss reference signal activation and deactivation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration component 620, a reference signal determination component 625, a path-loss estimation component 630, and a transmit power control component 635. The communications manager 615 may be an example of aspects of the communications manager 810 described herein.

The configuration component 620 may receive, from a base station, a configuration for a set of configured reference signals for path-loss estimation. The reference signal determination component 625 may determine, from the set of configured reference signals, a reference signal to use for the path-loss estimation. The path-loss estimation component 630 may calculate a path-loss estimate using the determined reference signal. The transmit power control component 635 may transmit an uplink message according to an uplink transmit power based on the path-loss estimate.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
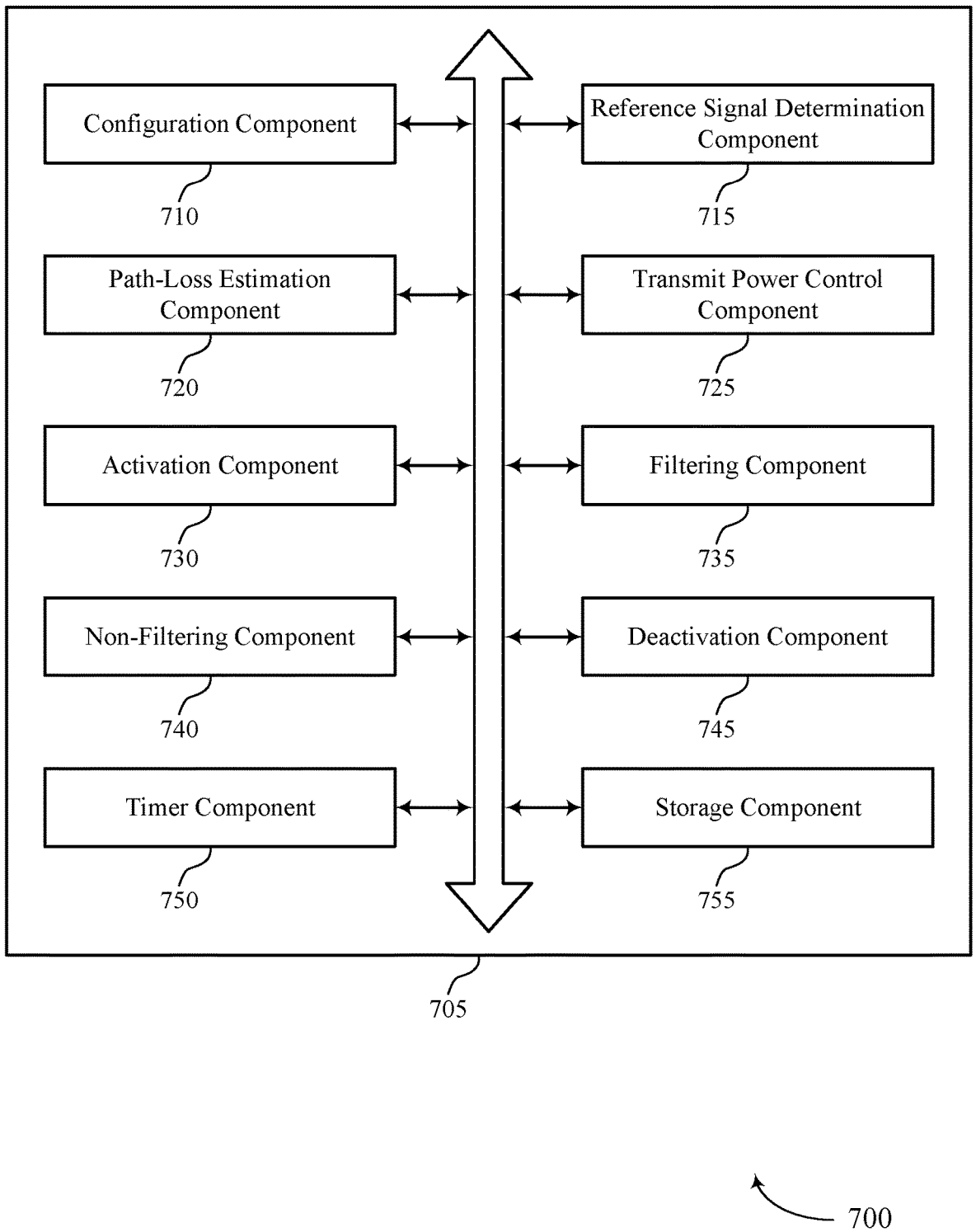
FIG. 7 shows a block diagram of a communications manager that supports path-loss estimation using path-loss reference signal activation and deactivation in accordance with one or more aspects of the present disclosure.

FIG. 7 shows a block diagram 700 of a communications manager 705 that supports path-loss estimation using path-loss reference signal activation and deactivation in accordance with one or more aspects of the present disclosure. The communications manager 705 may be an example of aspects of a communications manager 515, a communications manager 615, or a communications manager 810 described herein. The communications manager 705 may include a configuration component 710, a reference signal determination component 715, a path-loss estimation component 720, a transmit power control component 725, an activation component 730, a filtering component 735, a non-filtering component 740, a deactivation component 745, a timer component 750, a storage component 755, or any combination thereof. Each of these modules may communicate, directly or indirectly, with one another (e.g., via one or more buses).

The configuration component 710 may receive, from a base station, a configuration for a set of configured reference signals for path-loss estimation. In some examples, receiving the configuration may involve the configuration component 710 receiving an RRC message indicating the configuration.

The reference signal determination component 715 may determine, from the set of configured reference signals, a reference signal to use for the path-loss estimation. The path-loss estimation component 720 may calculate a path-loss estimate using the determined reference signal. The transmit power control component 725 may transmit an uplink message according to an uplink transmit power based on the path-loss estimate. In some cases, the uplink message includes an uplink data packet or an SRS or both.

The activation component 730 may update (e.g., activate) the determined reference signal, where determining the reference signal to use for the path-loss estimation is based on updating the determined reference signal (e.g., based on the determined reference signal being an activated reference signal). In some examples, the activation component 730 may receive, from the base station, a MAC-CE indicating the reference signal, where the updating is based on the MAC-CE. Updating the determined reference signal may involve activating the determined reference signal, where determining the reference signal to use for the path-loss estimation is based on the determined reference signal being an activated reference signal.

In some examples, the activation component 730 may receive, from the base station, a set of active reference signals corresponding to the determined reference signal following the updating and based on a periodicity of the determined reference signal. The filtering component 735 may measure a set of path-loss values based on receiving the set of active reference signals, where the path-loss estimate is calculated using the measured set of path-loss values. In some examples, the filtering component 735 may perform L3 filtering on the measured set of path-loss values, where the path-loss estimate is calculated based on the L3 filtering. In some examples, the filtering component 735 may determine the set of active reference signals to receive for the path-loss estimation based on a threshold number of active reference signals or a threshold duration for measuring the set of path-loss values or both.

In some other examples, the activation component 730 may receive, from the base station, the determined reference signal following the updating (e.g., the activating). The non-filtering component 740 may measure a path-loss value based on receiving the determined reference signal, where the path-loss estimate is calculated using the measured path-loss value.

The deactivation component 745 may update (e.g., deactivate) an additional reference signal of the set of configured reference signals based on updating (e.g., activating) the reference signal.

In some examples, the deactivation component 745 may receive, from the base station, the additional reference signal following the deactivating and may measure an additional path-loss value based on receiving the additional reference signal. In such some examples, the activation component 730 may further update (e.g., re-activate) the additional reference signal and may calculate an additional path-loss estimate using the measured additional path-loss value. The transmit power control component 725 may transmit an additional uplink message according to an additional uplink transmit power based on the additional path-loss estimate and based on re-activating the additional reference signal.

In some other examples, the deactivation component 745 may refrain from receiving the additional reference signal following the deactivating.

In yet some other examples, the timer component 750 may activate a timer following the deactivating. The timer component 750 may receive, from the base station, the additional reference signal following the deactivating if the timer is running. In some examples, the timer component 750 may identify an expiry of the timer and may refrain from receiving the additional reference signal following the deactivating if the timer is inactive.

The storage component 755 may store an additional path-loss estimate corresponding to the additional reference signal upon the deactivating. In some examples, the activation component 730 may further update (e.g., re-activate) the additional reference signal and the transmit power control component 725 may transmit an additional uplink message according to an additional uplink transmit power based on the stored additional path-loss estimate.

In some examples, determining the reference signal of the set of configured reference signals to use for the path-loss estimation may involve the reference signal determination component 715 determining a set of active reference signals of the set of configured reference signals to use for a set of path-loss estimations corresponding to a set of communication beams. In some cases, a number of reference signals in the set of active references signals is less than or equal to a number of reference signals in the set of configured reference signals. In some examples, the reference signal determination component 715 may transmit, to the base station, an indication of a UE beamforming capability, where the number of reference signals in the set of configured reference signals or the number of reference signals in the set of active references signals or both is based on the UE beamforming capability.

In some aspects, the reference signal determination component 715 may receive, from a base station, a MAC-CE updating a first reference signal and may determine, from a set of configured reference signals, a second reference signal to use for path-loss estimation based on the updated first reference signal. In some examples, if the MAC-CE activates the first reference signal, the first reference signal may be the same as the second reference signal. In some other examples, if the MAC-CE deactivates the first reference signal, the first reference signal may be different from the second reference signal. The path-loss estimation component 720 may calculate a path-loss estimate using the determined second reference signal. The transmit power control component 725 may transmit an uplink message according to an uplink transmit power based on the path-loss estimate.

Figure 8:
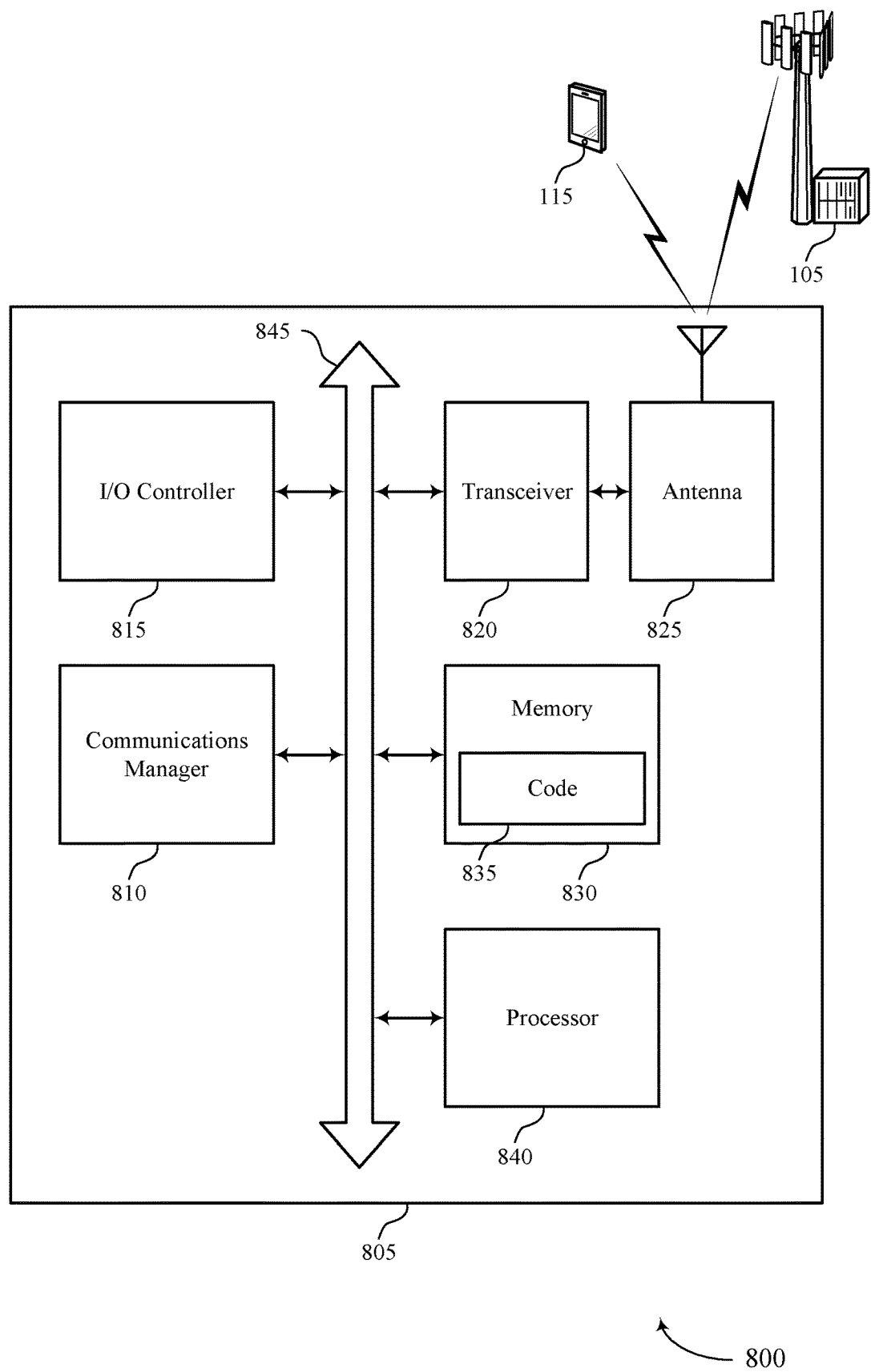
FIG. 8 shows a diagram of a system including a device that supports path-loss estimation using path-loss reference signal activation and deactivation in accordance with one or more aspects of the present disclosure.

FIG. 8 shows a diagram of a system 800 including a device 805 that supports path-loss estimation using path-loss reference signal activation and deactivation in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a configuration for a set of configured reference signals for path-loss estimation, determine, from the set of configured reference signals, a reference signal to use for the path-loss estimation, calculate a path-loss estimate using the determined reference signal, and transmit an uplink message according to an uplink transmit power based on the path-loss estimate.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting path-loss estimation using path-loss reference signal updating using a MAC-CE).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
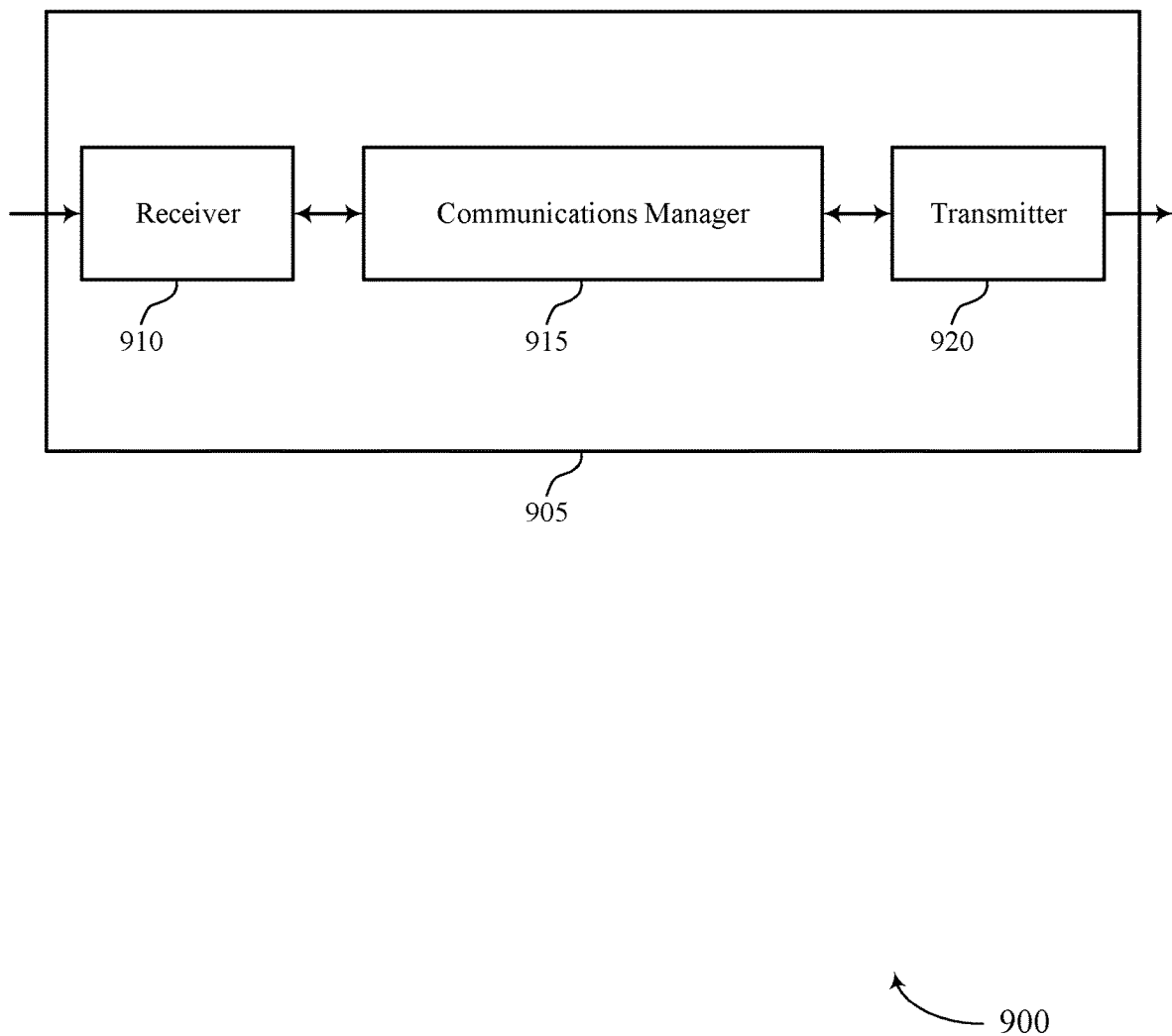
FIGS. 9 and 10 show block diagrams of devices that support path-loss estimation using path-loss reference signal activation and deactivation in accordance with one or more aspects of the present disclosure.

FIG. 9 shows a block diagram 900 of a device 905 that supports path-loss estimation using path-loss reference signal activation and deactivation in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to path-loss estimation using path-loss reference signal activation and deactivation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a configuration for a set of configured reference signals for path-loss estimation at the UE, update a reference signal of the set of configured reference signals for the path-loss estimation, transmit, to the UE, the updated reference signal, and receive, from the UE, an uplink message transmitted with an uplink transmit power based on a path-loss measurement for the updated reference signal.

The actions performed by the communications manager 915 as described herein may be implemented to realize one or more potential improvements in signaling overhead, signaling latency, or both. For example, updating (e.g., activating) a reference signal for path-loss estimation at a UE 115 may improve path-loss estimation. For example, transmitting activated path-loss reference signals—but refraining from transmitting deactivated path-loss reference signals—may support accurate path-loss estimations at the UE 115 while reducing signaling overhead and processing latency at the base station 105 (e.g., the device 905). Alternatively, transmitting deactivated path-loss reference signals may support low-latency switching between beam configurations (e.g., by maintaining path-loss estimates at the UE 115).

Based on updating (e.g., activating) the reference signal for path-loss estimation, a processor of the base station 105 (e.g., a processor controlling the receiver 910, the communications manager 915, the transmitter 920, etc.) may reduce processing resources used for path-loss estimation. For example, the base station 105 may transmit active path-loss reference signals and, in some cases, may refrain from transmitting inactive path-loss reference signals. As such, the base station 105 may reduce a number of times the processor ramps up processing power and turns on processing units to handle reference signal transmission. Furthermore, reducing the number of active reference signals for path-loss estimation may reduce the signaling overhead on the downlink channel. Additionally, implementing MAC-CEs to update (e.g., activate and deactivate) path-loss reference signals (e.g., as opposed to using RRC messaging) may improve the latency involved in activating and deactivating the reference signals.

The communications manager 915 may be an example of aspects of the communications manager 1210 described herein. The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
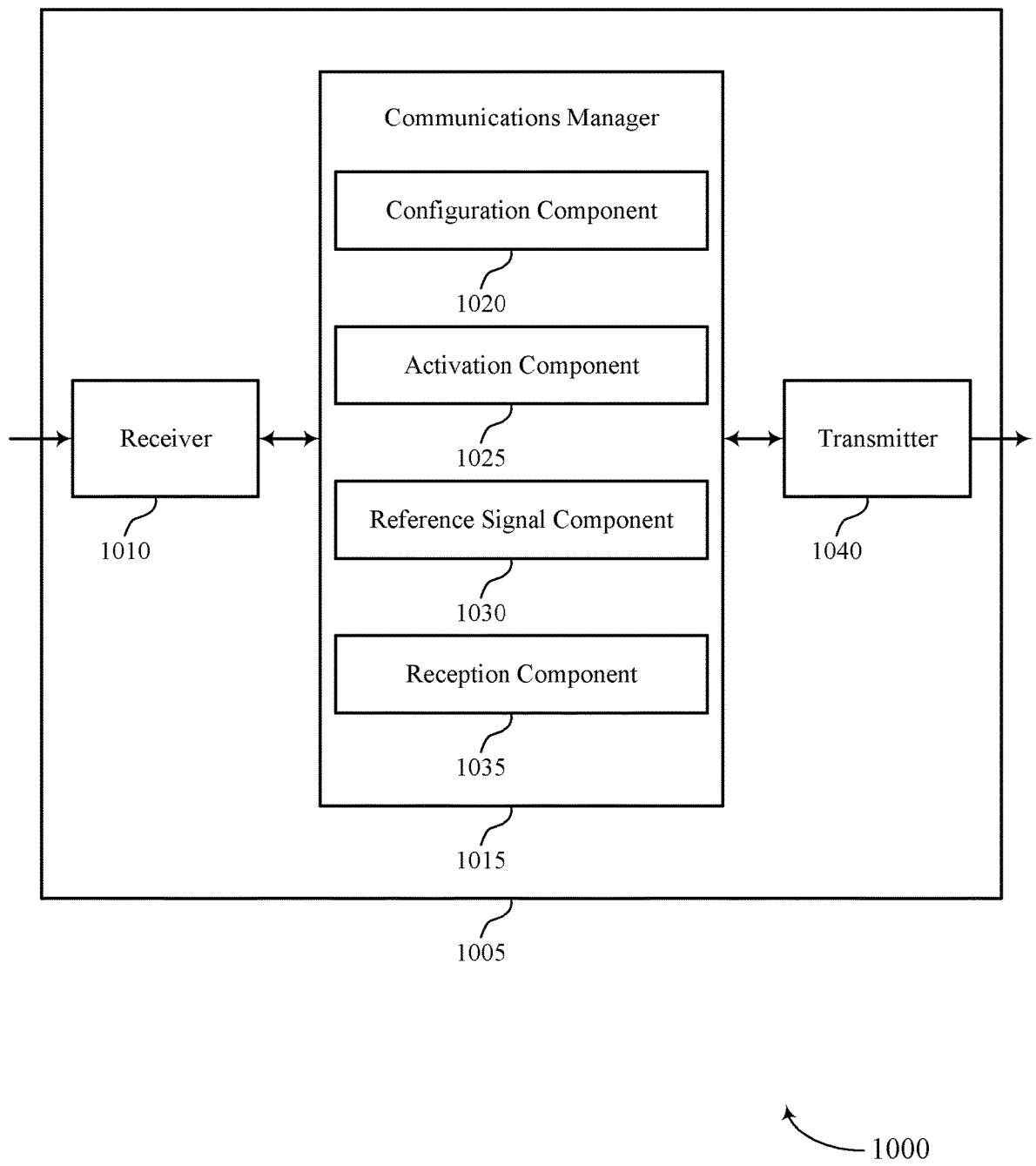

FIG. 10 shows a block diagram 1000 of a device 1005 that supports path-loss estimation using path-loss reference signal activation and deactivation in accordance with one or more aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to path-loss estimation using path-loss reference signal activation and deactivation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration component 1020, an activation component 1025, a reference signal component 1030, and a reception component 1035. The communications manager 1015 may be an example of aspects of the communications manager 1210 described herein.

The configuration component 1020 may transmit, to a UE, a configuration for a set of configured reference signals for path-loss estimation at the UE. The activation component 1025 may update (e.g., activate) a reference signal of the set of configured reference signals for the path-loss estimation. The reference signal component 1030 may transmit, to the UE, the updated (e.g., activated) reference signal. The reception component 1035 may receive, from the UE, an uplink message transmitted with an uplink transmit power based on a path-loss measurement for the updated (e.g., activated) reference signal.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
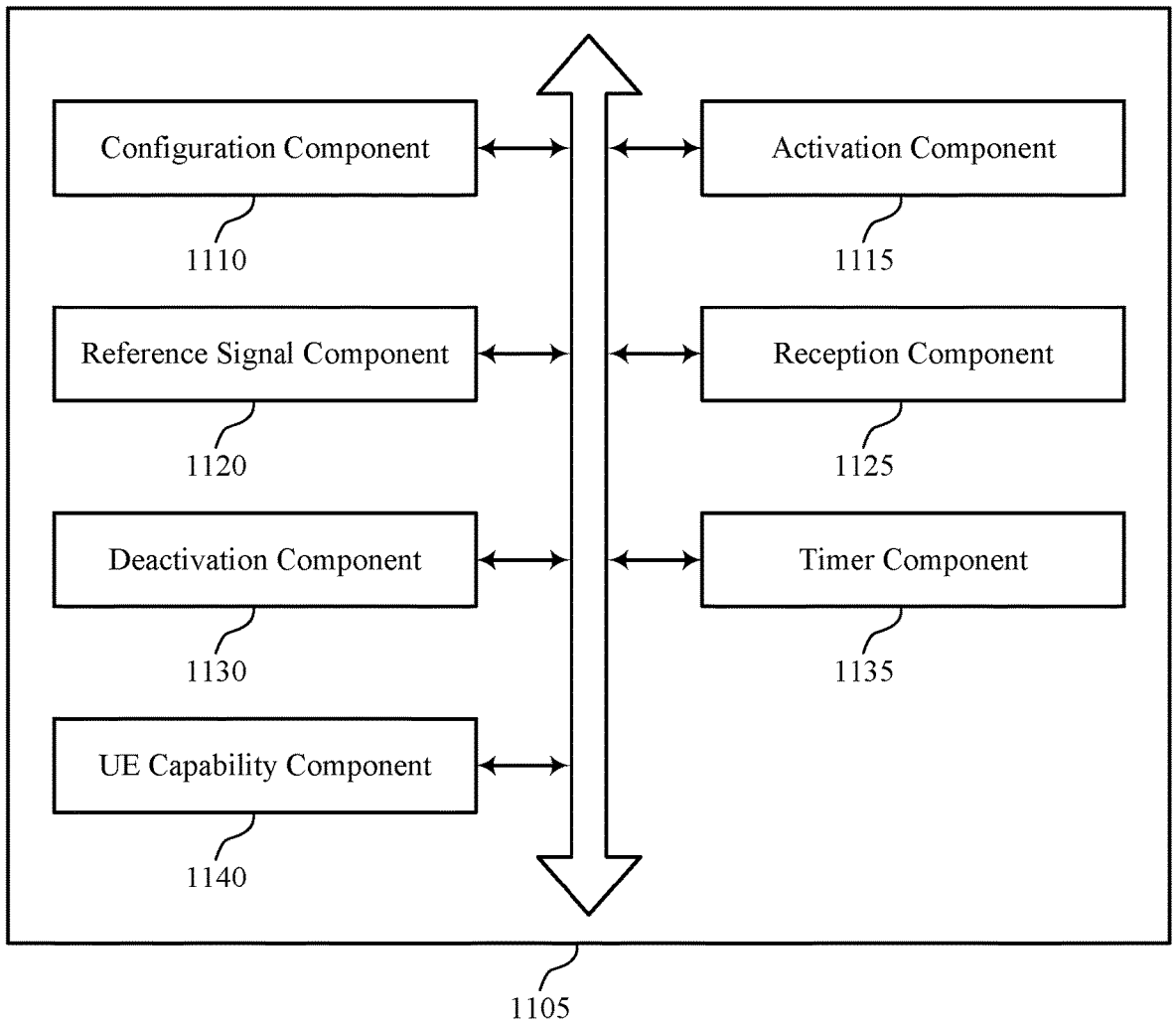
FIG. 11 shows a block diagram of a communications manager that supports path-loss estimation using path-loss reference signal activation and deactivation in accordance with one or more aspects of the present disclosure.

FIG. 11 shows a block diagram 1100 of a communications manager 1105 that supports path-loss estimation using path-loss reference signal activation and deactivation in accordance with one or more aspects of the present disclosure. The communications manager 1105 may be an example of aspects of a communications manager 915, a communications manager 1015, or a communications manager 1210 described herein. The communications manager 1105 may include a configuration component 1110, an activation component 1115, a reference signal component 1120, a reception component 1125, a deactivation component 1130, a timer component 1135, a UE capability component 1140, or any combination thereof. Each of these modules may communicate, directly or indirectly, with one another (e.g., via one or more buses).

The configuration component 1110 may transmit, to a UE, a configuration for a set of configured reference signals for path-loss estimation at the UE. In some examples, transmitting the configuration may involve the configuration component 1110 transmitting an RRC message indicating the configuration.

The activation component 1115 may update a reference signal of the set of configured reference signals for the path-loss estimation. In some examples, updating the reference signal may involve the activation component 1115 transmitting, to the UE, a MAC-CE indicating the reference signal. In some examples, updating the reference signal may involve activating the reference signal.

The reference signal component 1120 may transmit, to the UE, the updated (e.g., activated) reference signal. The reception component 1125 may receive, from the UE, an uplink message transmitted with an uplink transmit power based on a path-loss measurement for the updated (e.g., activated) reference signal. In some cases, the uplink message includes an uplink data packet or an SRS or both.

In some examples, transmitting the updated (e.g., activated) reference signal may involve the reference signal component 1120 transmitting, to the UE, a set of active reference signals corresponding to the updated (e.g., activated) reference signal following the updating and based on a periodicity of the updated (e.g., activated) reference signal, where the uplink transmit power is based on a set of path-loss measurements for the set of active reference signals.

In some cases, the deactivation component 1130 may transmit, to the UE, a deactivated reference signal of the set of configured reference signals. In some examples, the activation component 1115 may update (e.g., activate) the deactivated reference signal for the path-loss estimation and the reception component 1125 may receive, from the UE, an additional uplink message according to an additional uplink transmit power based on an additional path-loss measurement for the deactivated reference signal.

In some other cases, the deactivation component 1130 may refrain from transmitting a deactivated reference signal of the set of configured reference signals.

In yet some other cases, the deactivation component 1130 may update (e.g., deactivate) an additional reference signal of the set of configured reference signals for the path-loss estimation. The timer component 1135 may activate a timer following the deactivating and may transmit, to the UE, the additional reference signal following the deactivating if the timer is running. In some examples, the timer component 1135 may identify an expiry of the timer and may refrain from transmitting the additional reference signal following the deactivating if the timer is inactive.

In some examples, the activation component 1115 may update (e.g., activate) a set of reference signals of the set of configured reference signals for a set of path-loss estimations corresponding to a set of communication beams. In some cases, a number of reference signals in the set of activated references signals is less than or equal to a number of reference signals in the set of configured reference signals.

The UE capability component 1140 may receive, from the UE, an indication of a UE beamforming capability and may determine the configuration based on the UE beamforming capability.

Figure 12:
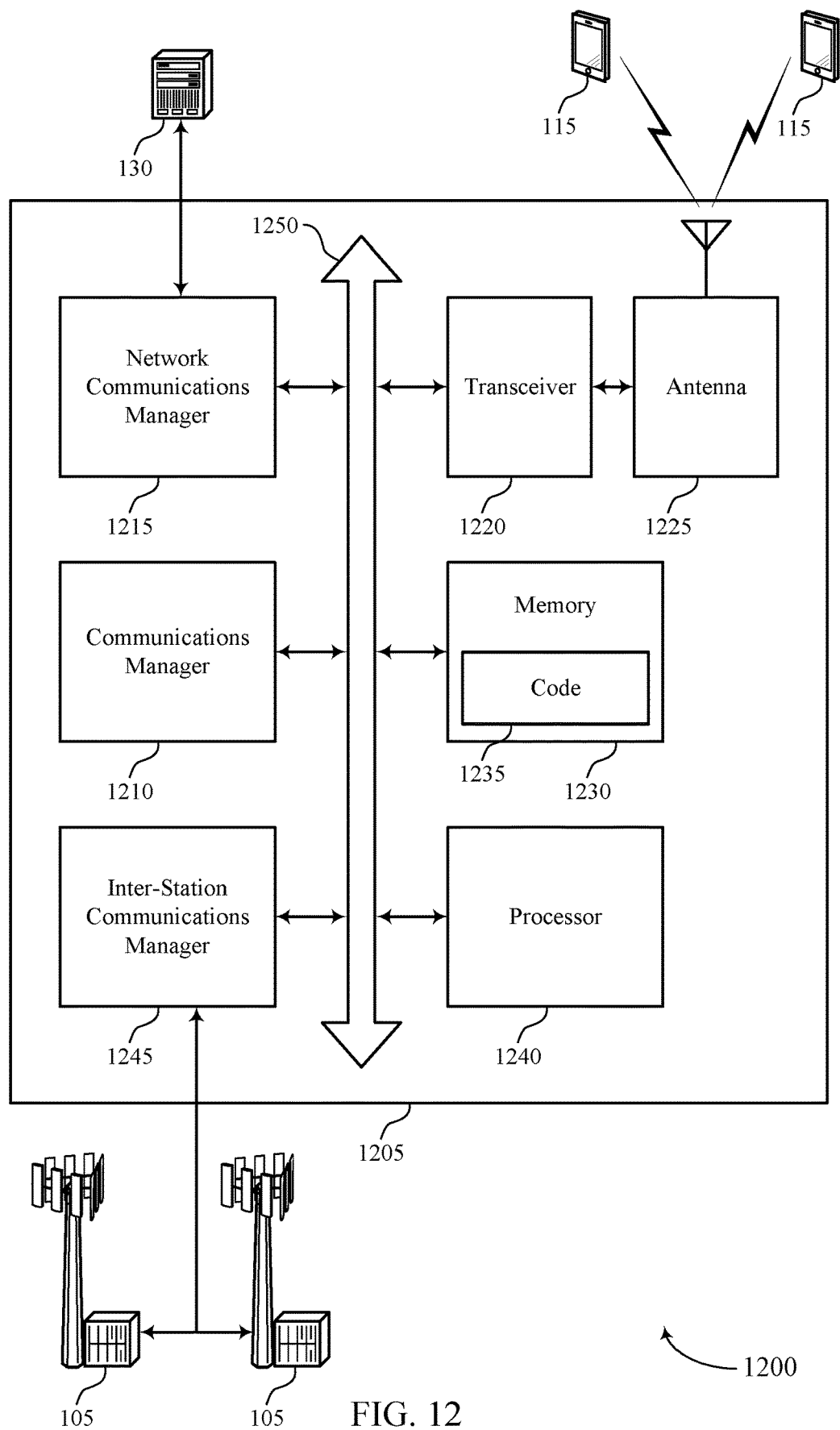
FIG. 12 shows a diagram of a system including a device that supports path-loss estimation using path-loss reference signal activation and deactivation in accordance with one or more aspects of the present disclosure.

FIG. 12 shows a diagram of a system 1200 including a device 1205 that supports path-loss estimation using path-loss reference signal activation and deactivation in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245.

These components may be in electronic communication via one or more buses (e.g., bus 1250).

The communications manager 1210 may transmit, to a UE, a configuration for a set of configured reference signals for path-loss estimation at the UE, update a reference signal of the set of configured reference signals for the path-loss estimation, transmit, to the UE, the updated (e.g., activated) reference signal, and receive, from the UE, an uplink message transmitted with an uplink transmit power based on a path-loss measurement for the updated (e.g., activated) reference signal.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting path-loss estimation using path-loss reference signal updating using a MAC-CE).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
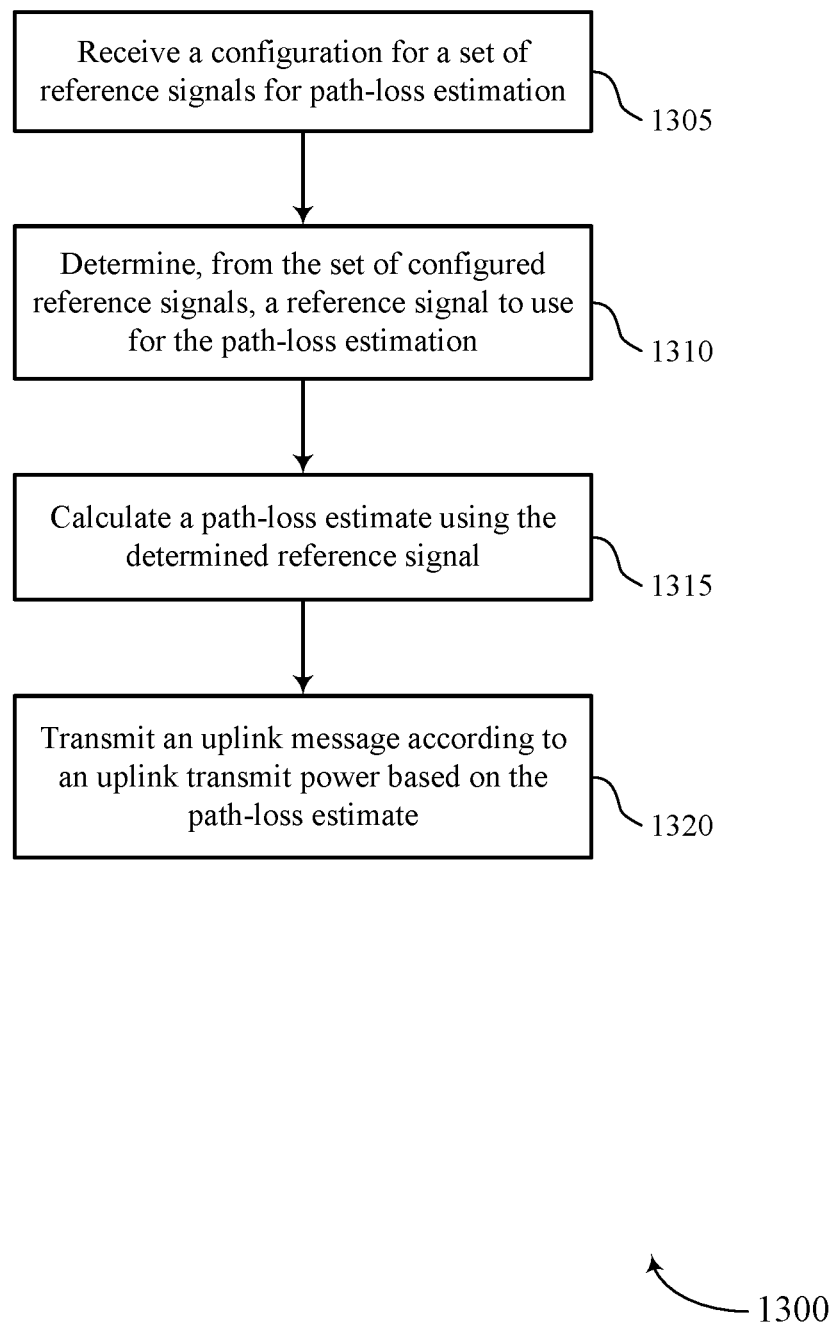
FIGS. 13 through 17 show flowcharts illustrating methods that support path-loss estimation using path-loss reference signal activation and deactivation in accordance with one or more aspects of the present disclosure.

FIG. 13 shows a flowchart illustrating a method 1300 that supports path-loss estimation using path-loss reference signal activation and deactivation in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, a configuration for a set of configured reference signals for path-loss estimation. The operations of 1305 may be performed according to the methods described herein. In some examples, aspects of the operations of 1305 may be performed by a configuration component as described with reference to FIGS. 5 through 8.

At 1310, the UE may determine, from the set of configured reference signals, a reference signal to use for the path-loss estimation. The operations of 1310 may be performed according to the methods described herein. In some examples, aspects of the operations of 1310 may be performed by a reference signal determination component as described with reference to FIGS. 5 through 8.

At 1315, the UE may calculate a path-loss estimate using the determined reference signal. The operations of 1315 may be performed according to the methods described herein. In some examples, aspects of the operations of 1315 may be performed by a path-loss estimation component as described with reference to FIGS. 5 through 8.

At 1320, the UE may transmit an uplink message according to an uplink transmit power based on the path-loss estimate. The operations of 1320 may be performed according to the methods described herein. In some examples, aspects of the operations of 1320 may be performed by a transmit power control component as described with reference to FIGS. 5 through 8.

Figure 14:
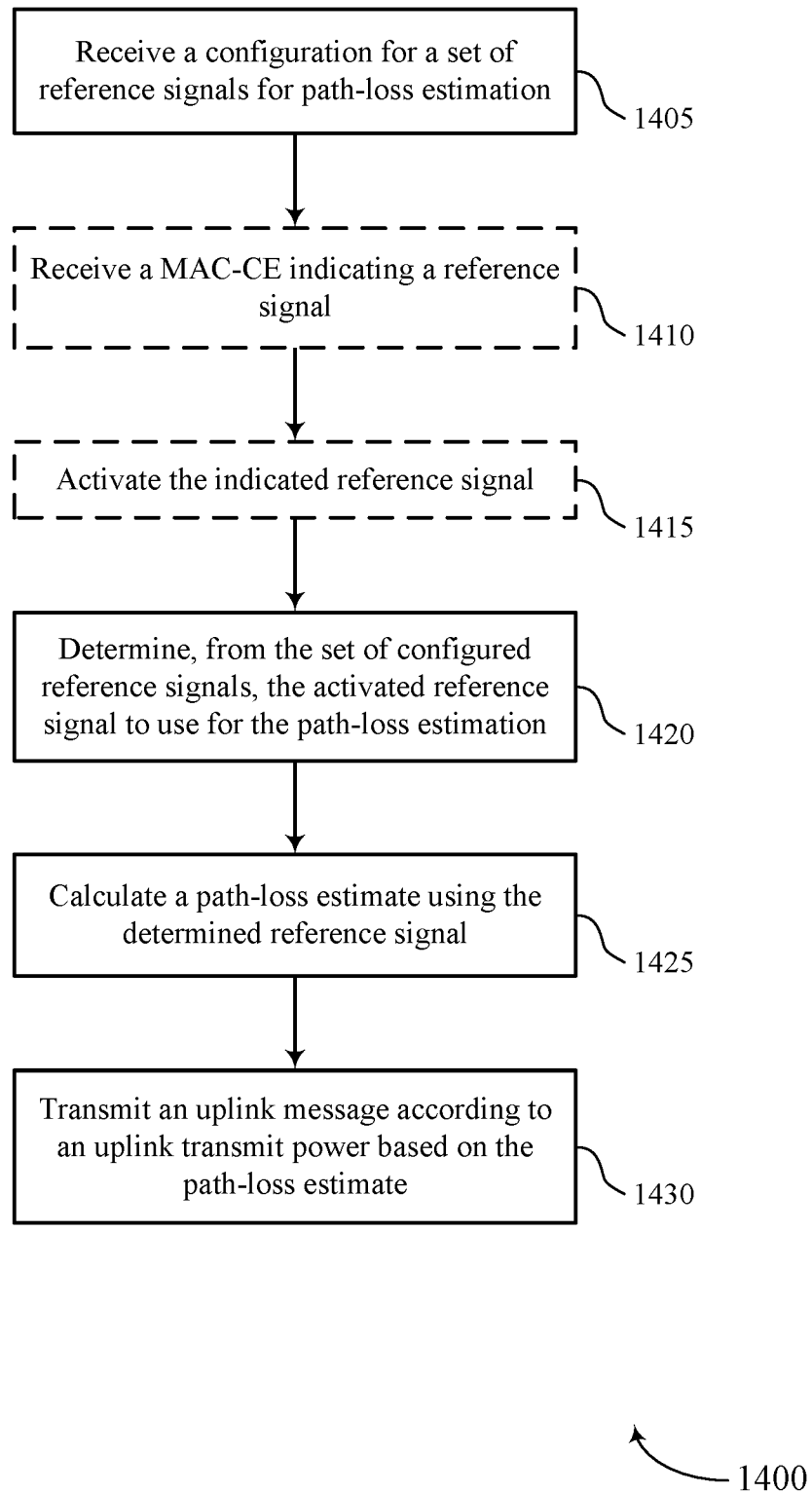

FIG. 14 shows a flowchart illustrating a method 1400 that supports path-loss estimation using path-loss reference signal activation and deactivation in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration for a set of reference signals for path-loss estimation. The operations of 1405 may be performed according to the methods described herein. In some examples, aspects of the operations of 1405 may be performed by a configuration component as described with reference to FIGS. 5 through 8.

At 1410, the UE may receive, from the base station, a MAC CE indicating a reference signal. The operations of 1410 may be performed according to the methods described herein. In some examples, aspects of the operations of 1410 may be performed by an activation component as described with reference to FIGS. 5 through 8.

At 1415, the UE may update (e.g., activate) the reference signal indicated by the MAC CE. The operations of 1415 may be performed according to the methods described herein. In some examples, aspects of the operations of 1415 may be performed by an activation component as described with reference to FIGS. 5 through 8.

At 1420, the UE may determine, from the set of configured reference signals, a reference signal to use for the path-loss estimation, where determining the reference signal to use for the path-loss estimation is based on the determined reference signal being the updated (e.g., activated) reference signal. The operations of 1420 may be performed according to the methods described herein. In some examples, aspects of the operations of 1420 may be performed by a reference signal determination component as described with reference to FIGS. 5 through 8.

At 1425, the UE may calculate a path-loss estimate using the determined reference signal. The operations of 1425 may be performed according to the methods described herein. In some examples, aspects of the operations of 1425 may be performed by a path-loss estimation component as described with reference to FIGS. 5 through 8.

At 1430, the UE may transmit an uplink message according to an uplink transmit power based on the path-loss estimate. The operations of 1430 may be performed according to the methods described herein. In some examples, aspects of the operations of 1430 may be performed by a transmit power control component as described with reference to FIGS. 5 through 8.

Figure 15:
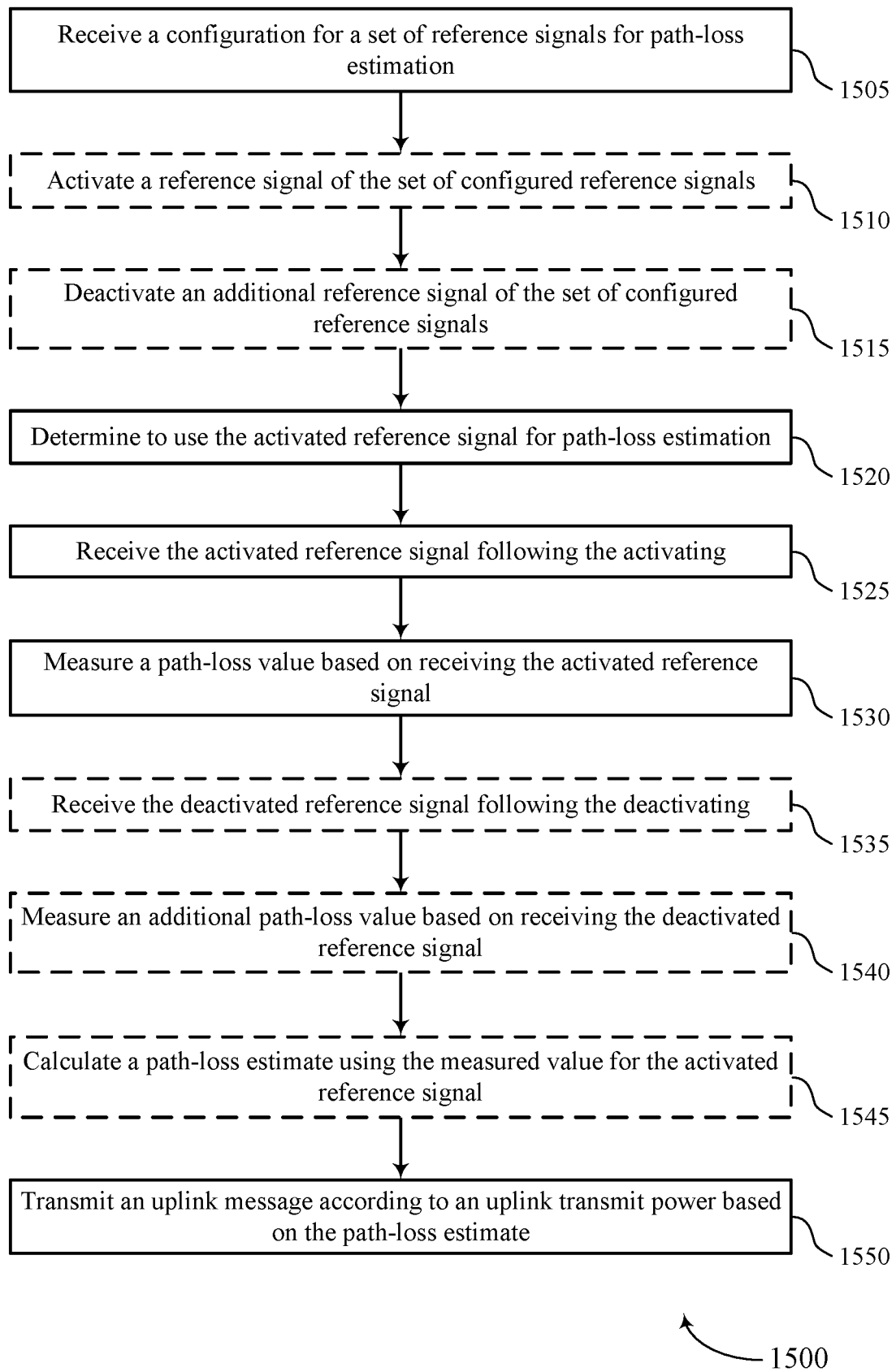

FIG. 15 shows a flowchart illustrating a method 1500 that supports path-loss estimation using path-loss reference signal activation and deactivation in accordance with one or more aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration for a set of reference signals for path-loss estimation. The operations of 1505 may be performed according to the methods described herein. In some examples, aspects of the operations of 1505 may be performed by a configuration component as described with reference to FIGS. 5 through 8.

At 1510, the UE may update (e.g., activate) a reference signal. The operations of 1510 may be performed according to the methods described herein. In some examples, aspects of the operations of 1510 may be performed by an activation component as described with reference to FIGS. 5 through 8.

At 1515, the UE may update (e.g., deactivate) an additional reference signal of the set of configured reference signals (e.g., based on activating the reference signal). The operations of 1515 may be performed according to the methods described herein. In some examples, aspects of the operations of 1515 may be performed by a deactivation component as described with reference to FIGS. 5 through 8.

At 1520, the UE may determine, from the set of configured reference signals, a reference signal to use for the path-loss estimation, where determining the reference signal to use for the path-loss estimation is based on the determined reference signal being an activated reference signal. The operations of 1520 may be performed according to the methods described herein. In some examples, aspects of the operations of 1520 may be performed by a reference signal determination component as described with reference to FIGS. 5 through 8.

At 1525, the UE may receive, from the base station, the determined reference signal following the activating. The operations of 1525 may be performed according to the methods described herein. In some examples, aspects of the operations of 1525 may be performed by an activation component as described with reference to FIGS. 5 through 8.

At 1530, the UE may measure a path-loss value based on receiving the determined reference signal, where the path-loss estimate is calculated using the measured path-loss value. The operations of 1530 may be performed according to the methods described herein. In some examples, aspects of the operations of 1530 may be performed by a non-filtering component as described with reference to FIGS. 5 through 8.

At 1535, the UE may receive, from the base station, the additional reference signal following the deactivating. The operations of 1535 may be performed according to the methods described herein. In some examples, aspects of the operations of 1535 may be performed by a deactivation component as described with reference to FIGS. 5 through 8.

At 1540, the UE may measure an additional path-loss value based on receiving the additional reference signal (i.e., the deactivated reference signal). The operations of 1540 may be performed according to the methods described herein. In some examples, aspects of the operations of 1540 may be performed by a deactivation component as described with reference to FIGS. 5 through 8.

At 1545, the UE may calculate the path-loss estimate using the determined reference signal (e.g., the measured path-loss value for the determined reference signal). The operations of 1545 may be performed according to the methods described herein. In some examples, aspects of the operations of 1545 may be performed by a path-loss estimation component as described with reference to FIGS. 5 through 8.

At 1550, the UE may transmit an uplink message according to an uplink transmit power based on the path-loss estimate. The operations of 1550 may be performed according to the methods described herein. In some examples, aspects of the operations of 1550 may be performed by a transmit power control component as described with reference to FIGS. 5 through 8.

Figure 16:
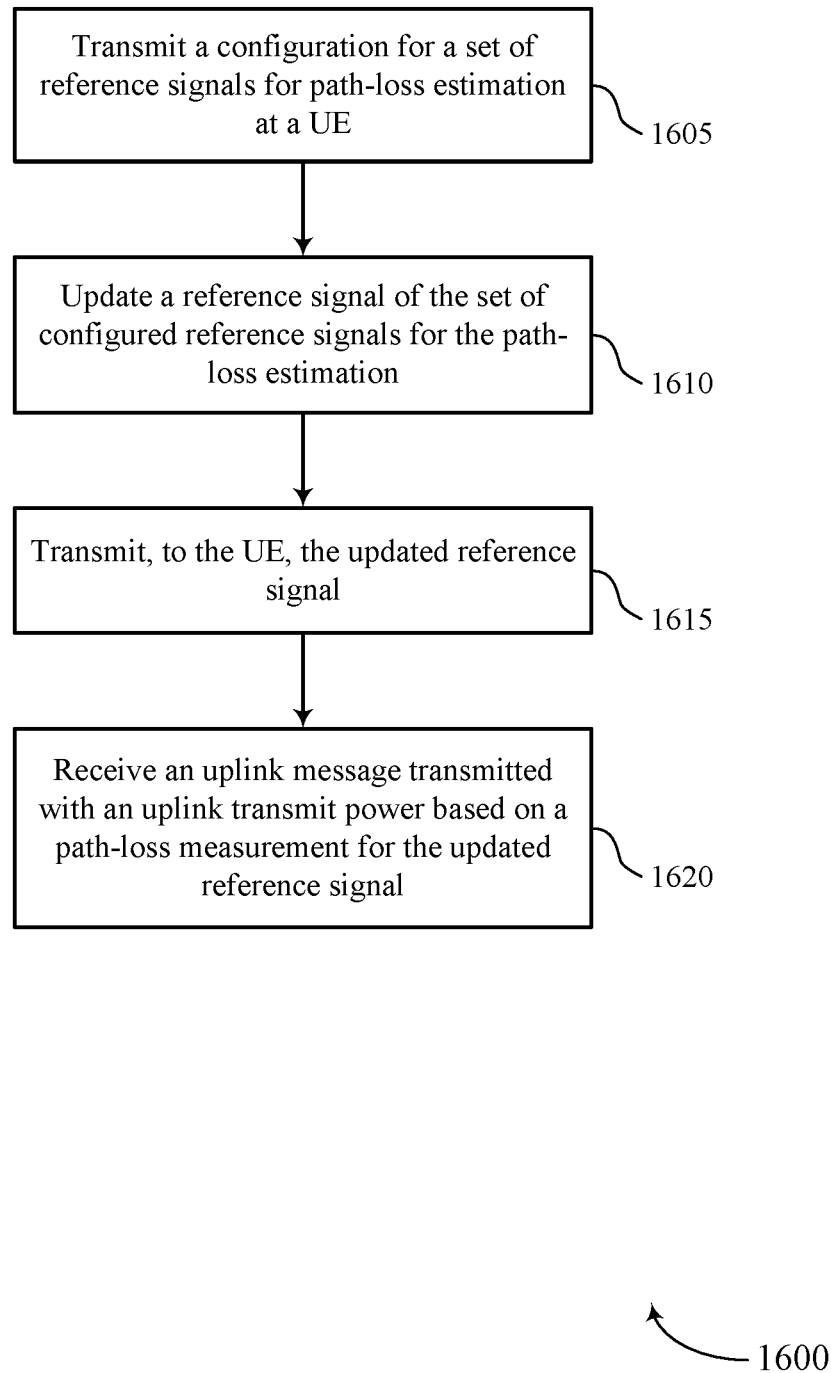

FIG. 16 shows a flowchart illustrating a method 1600 that supports path-loss estimation using path-loss reference signal activation and deactivation in accordance with one or more aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, a configuration for a set of configured reference signals for path-loss estimation at the UE. The operations of 1605 may be performed according to the methods described herein. In some examples, aspects of the operations of 1605 may be performed by a configuration component as described with reference to FIGS. 9 through 12.

At 1610, the base station may update (e.g., activate) a reference signal of the set of configured reference signals for the path-loss estimation. The operations of 1610 may be performed according to the methods described herein. In some examples, aspects of the operations of 1610 may be performed by an activation component as described with reference to FIGS. 9 through 12.

At 1615, the base station may transmit, to the UE, the updated (e.g., activated) reference signal. The operations of 1615 may be performed according to the methods described herein. In some examples, aspects of the operations of 1615 may be performed by a reference signal component as described with reference to FIGS. 9 through 12.

At 1620, the base station may receive, from the UE, an uplink message transmitted with an uplink transmit power based on a path-loss measurement for the updated (e.g., activated) reference signal. The operations of 1620 may be performed according to the methods described herein. In some examples, aspects of the operations of 1620 may be performed by a reception component as described with reference to FIGS. 9 through 12.

Figure 17:
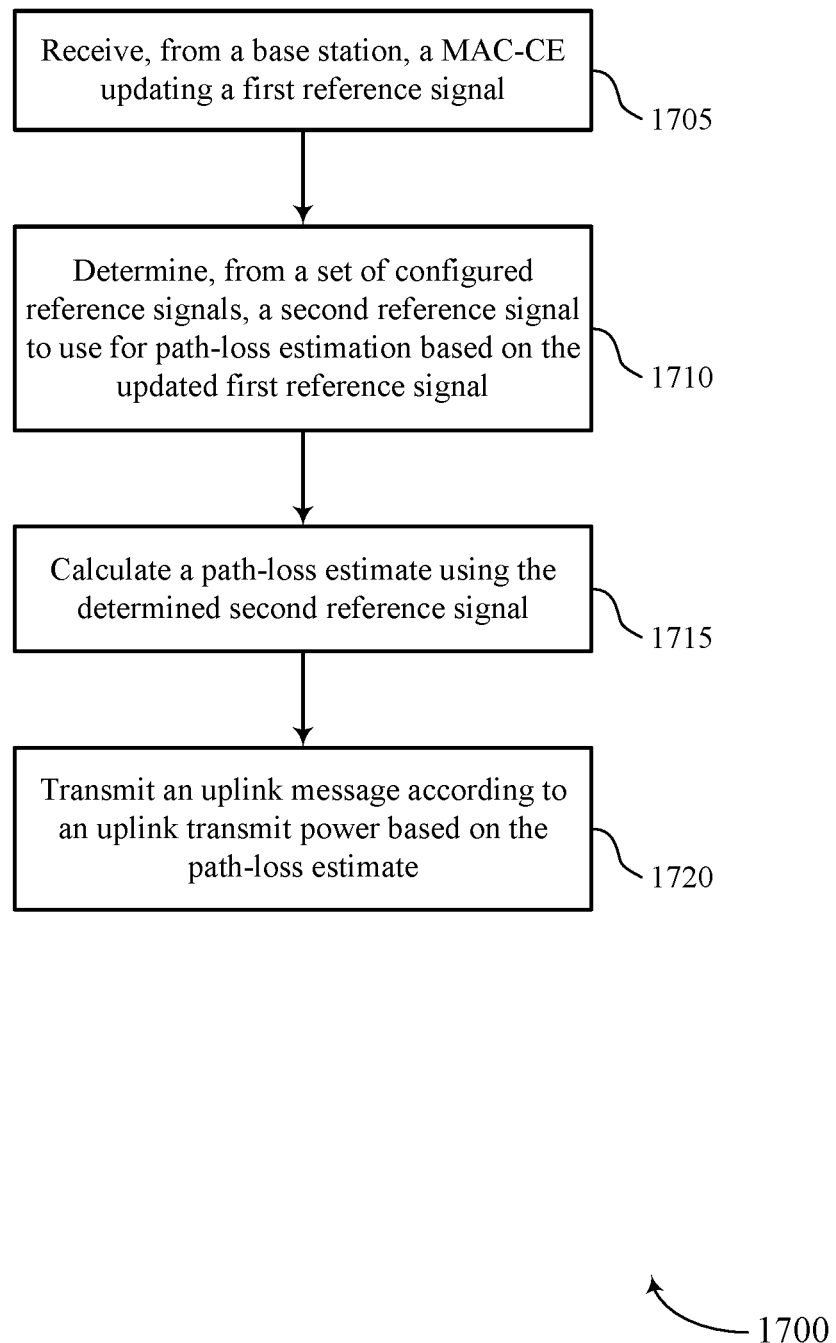

FIG. 17 shows a flowchart illustrating a method 1700 that supports path-loss estimation using path-loss reference signal activation and deactivation in accordance with one or more aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a MAC-CE updating a first reference signal. The operations of 1705 may be performed according to the methods described herein. In some examples, aspects of the operations of 1705 may be performed by a reference signal determination component as described with reference to FIGS. 5 through 8.

At 1710, the UE may determine, from a set of configured reference signals, a second reference signal to use for path-loss estimation based on the updated first reference signal. The operations of 1710 may be performed according to the methods described herein. In some examples, aspects of the operations of 1710 may be performed by a reference signal determination component as described with reference to FIGS. 5 through 8.

At 1715, the UE may calculate a path-loss estimate using the determined second reference signal. The operations of 1715 may be performed according to the methods described herein. In some examples, aspects of the operations of 1715 may be performed by a path-loss estimation component as described with reference to FIGS. 5 through 8.

At 1720, the UE may transmit an uplink message according to an uplink transmit power based on the path-loss estimate. The operations of 1720 may be performed according to the methods described herein. In some examples, aspects of the operations of 1720 may be performed by a transmit power control component as described with reference to FIGS. 5 through 8.

It should be noted that the methods described herein describe possible implementations, and that the operations may be rearranged or otherwise modified and that other implementations are possible. Further, aspects from two or more of the methods may be combined.

The following examples are given by way of illustration. Aspects of the following examples may be combined with aspects shown or discussed in relation to the figures or elsewhere herein.

Example 1: A method for wireless communications at a UE, comprising: receiving, from a base station, a configuration for a plurality of configured reference signals for path-loss estimation; determining, from the plurality of configured reference signals, a reference signal to use for the path-loss estimation; calculating a path-loss estimate using the determined reference signal; and transmitting an uplink message according to an uplink transmit power based at least in part on the path-loss estimate.

Example 2: The method of example 1, further comprising: updating the determined reference signal, wherein determining the reference signal to use for the path-loss estimation is based at least in part on the updating the determined reference signal.

Example 3: The method of example 2, wherein: updating the determined reference signal comprises activating the determined reference signal; and determining the reference signal to use for the path-loss estimation is based at least in part on the determined reference signal being an activated reference signal.

Example 4: The method of any of examples 2 or 3, further comprising: receiving, from the base station, a MAC-CE indicating the reference signal, wherein the updating is based at least in part on the MAC-CE.

Example 5: The method of any of examples 2-4, further comprising: receiving, from the base station, a plurality of active reference signals corresponding to the determined reference signal following the updating and based at least in part on a periodicity of the determined reference signal; and measuring a plurality of path-loss values based at least in part on receiving the plurality of active reference signals, wherein the path-loss estimate is calculated using the measured plurality of path-loss values.

Example 6: The method of example 5, further comprising: performing L3 filtering on the measured plurality of path-loss values, wherein the path-loss estimate is calculated based at least in part on the L3 filtering.

Example 7: The method of any of examples 5 or 6, further comprising: determining the plurality of active reference signals to receive for the path-loss estimation based at least in part on a threshold number of active reference signals or a threshold duration for measuring the plurality of path-loss values or both.

Example 8: The method of any of examples 2-7, further comprising: receiving, from the base station, the determined reference signal following the updating; and measuring a path-loss value based at least in part on receiving the determined reference signal, wherein the path-loss estimate is calculated using the measured path-loss value.

Example 9: The method of any of examples 2-8, further comprising: updating an additional reference signal of the plurality of configured reference signals based at least in part on updating the determined reference signal, wherein the updating the additional reference signal comprises deactivating the additional reference signal.

Example 10: The method of example 9, further comprising: receiving, from the base station, the additional reference signal following the deactivating; and measuring an additional path-loss value based at least in part on receiving the additional reference signal.

Example 11: The method of example 10, further comprising: further updating the additional reference signal, wherein the further updating the additional reference signal comprises re-activating the additional reference signal; calculating an additional path-loss estimate using the measured additional path-loss value; and transmitting an additional uplink message according to an additional uplink transmit power based at least in part on the additional path-loss estimate and the re-activating the additional reference signal.

Example 12: The method of example 9, further comprising: refraining from receiving the additional reference signal following the deactivating.

Example 13: The method of example 9, further comprising: activating a timer following the deactivating; receiving, from the base station, the additional reference signal following the deactivating if the timer is running; identifying an expiry of the timer; and refraining from receiving the additional reference signal following the deactivating if the timer is inactive.

Example 14: The method of any of examples 9-13, further comprising: storing an additional path-loss estimate corresponding to the additional reference signal upon the deactivating; further updating the additional reference signal, wherein the further updating the additional reference signal comprises re-activating the additional reference signal; and transmitting an additional uplink message according to an additional uplink transmit power based at least in part on the stored additional path-loss estimate and the re-activating the additional reference signal.

Example 15: The method of any of examples 1-14, wherein determining the reference signal of the plurality of configured reference signals to use for the path-loss estimation comprises: determining a plurality of active reference signals of the plurality of configured reference signals to use for a plurality of path-loss estimations corresponding to a plurality of communication beams.

Example 16: The method of example 15, wherein a number of reference signals in the plurality of active references signals is less than or equal to a number of reference signals in the plurality of configured reference signals.

Example 17: The method of any of examples 15 or 16, further comprising: transmitting, to the base station, an indication of a UE beamforming capability, wherein a number of reference signals in the plurality of configured reference signals or a number of reference signals in the plurality of active references signals or both is based at least in part on the UE beamforming capability.

Example 18: The method of any of examples 1-17, wherein receiving the configuration comprises: receiving an RRC message indicating the configuration.

Example 19: The method of any of examples 1-18, wherein the uplink message comprises an uplink data packet or an SRS or both.

Example 20: A method for wireless communications at a base station, comprising: transmitting, to a UE, a configuration for a plurality of configured reference signals for path-loss estimation at the UE; updating a reference signal of the plurality of configured reference signals for the path-loss estimation; transmitting, to the UE, the updated reference signal; and receiving, from the UE, an uplink message transmitted with an uplink transmit power based at least in part on a path-loss measurement for the updated reference signal.

Example 21: The method of example 20, wherein updating the reference signal comprises: transmitting, to the UE, a MAC-CE indicating the reference signal.

Example 22: The method of any of examples 20 or 21, wherein updating the reference signal comprises activating the reference signal.

Example 23: The method of any of examples 20-22, wherein transmitting the updated reference signal comprises: transmitting, to the UE, a plurality of active reference signals corresponding to the updated reference signal following the updating and based at least in part on a periodicity of the updated reference signal, wherein the uplink transmit power is based at least in part on a plurality of path-loss measurements for the plurality of active reference signals.

Example 24: The method of any of examples 20-23, further comprising: transmitting, to the UE, a deactivated reference signal of the plurality of configured reference signals.

Example 25: The method of example 24, further comprising: updating the deactivated reference signal for the path-loss estimation, wherein the updating the deactivated reference signal comprises activating the deactivated reference signal; and receiving, from the UE, an additional uplink message according to an additional uplink transmit power based at least in part on an additional path-loss measurement for the deactivated reference signal.

Example 26: The method of any of examples 20-23, further comprising: refraining from transmitting a deactivated reference signal of the plurality of configured reference signals.

Example 27: The method of any of examples 20-23, further comprising: updating an additional reference signal of the plurality of configured reference signals for the path-loss estimation, wherein the updating the additional reference signal comprises deactivating the additional reference signal; activating a timer following the deactivating; transmitting, to the UE, the additional reference signal following the deactivating if the timer is running; identifying an expiry of the timer; and refraining from transmitting the additional reference signal following the deactivating if the timer is inactive.

Example 28: The method of any of examples 20-27, further comprising: updating a plurality of reference signals of the plurality of configured reference signals for a plurality of path-loss estimations corresponding to a plurality of communication beams, wherein the updating the plurality of reference signals comprises activating the plurality of reference signals.

Example 29: The method of example 28, wherein a number of reference signals in the plurality of activated references signals is less than or equal to a number of reference signals in the plurality of configured reference signals.

Example 30: The method of any of examples 20-29, further comprising: receiving, from the UE, an indication of a UE beamforming capability; and determining the configuration based at least in part on the UE beamforming capability.

Example 31: The method of any of examples 20-30, wherein transmitting the configuration comprises: transmitting an RRC message indicating the configuration.

Example 32: The method of any of examples 20-31, wherein the uplink message comprises an uplink data packet or an SRS or both.

Example 33: A method for wireless communications at a UE, comprising: receiving, from a base station, a MAC-CE updating a first reference signal; determining, from a plurality of configured reference signals, a second reference signal to use for path-loss estimation based at least in part on the updated first reference signal; calculating a path-loss estimate using the determined second reference signal; and transmitting an uplink message according to an uplink transmit power based at least in part on the path-loss estimate.

Example 34: The method of example 33, wherein: the MAC-CE activates the first reference signal and the first reference signal is the same as the second reference signal; or the MAC-CE deactivates the first reference signal and the first reference signal is different from the second reference signal.

Example 35: An apparatus for wireless communications comprising a processor; and memory coupled to the processor, the processor and memory configured to perform a method of any of examples 1-19.

Example 36: An apparatus for wireless communications comprising a processor; and memory coupled to the processor, the processor and memory configured to perform a method of any of examples 20-32.

Example 37: An apparatus for wireless communications comprising a processor; and memory coupled to the processor, the processor and memory configured to perform a method of any of examples 33 or 34.

Example 38: An apparatus comprising at least one means for performing a method of any of examples 1-19.

Example 39: An apparatus comprising at least one means for performing a method of any of examples 20-32.

Example 40: An apparatus comprising at least one means for performing a method of any of examples 33 or 34.

Example 41: A non-transitory computer-readable medium storing code for wireless communications, the code comprising instructions executable by a processor to perform a method of any of examples 1-19.

Example 42: A non-transitory computer-readable medium storing code for wireless communications, the code comprising instructions executable by a processor to perform a method of any of examples 20-32.

Example 43: A non-transitory computer-readable medium storing code for wireless communications, the code comprising instructions executable by a processor to perform a method of any of examples 33 or 34.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a network entity, a configuration for a plurality of reference signals for path-loss estimation;
    receiving, from the network entity, a medium access control-control element (MAC-CE) updating a reference signal from the plurality of reference signals to use for the path-loss estimation;
    updating the reference signal in response to receiving the MAC-CE, wherein updating the reference signal includes activating the reference signal from the plurality of reference signals to use for the path-loss estimation;
    performing layer 3 filtering on a plurality of measurements for the path-loss estimation, wherein performing the layer 3 filtering is based at least in part on activating the reference signal; and
    transmitting an uplink message according to an uplink transmit power based at least in part on the layer 3 filtering.

2. The method of claim 1, further comprising:
    receiving, from the network entity, a plurality of repetitions of the updated reference signal in accordance with a periodicity of the updated reference signal, wherein the plurality of measurements corresponds to the received plurality of repetitions of the updated reference signal.

3. The method of claim 2, further comprising:
performing the plurality of measurements on the received plurality of repetitions of the updated reference signal.

4. The method of claim 1, further comprising:
calculating a path-loss estimate based at least in part on the updated reference signal and the layer 3 filtering, wherein the uplink transmit power is further based at least in part on the path-loss estimate.

5. The method of claim 1, further comprising:
receiving, from the network entity, a threshold quantity of active reference signals corresponding to the updated reference signal, wherein the plurality of measurements corresponds to the threshold quantity of active reference signals.

6. The method of claim 5, further comprising:
calculating a path-loss estimate using the threshold quantity of active reference signals, wherein the uplink transmit power is further based at least in part on the path-loss estimate.

7. The method of claim 1, further comprising:
receiving, from the network entity, a plurality of active reference signals corresponding to the updated reference signal in accordance with a threshold duration for performing the plurality of measurements, wherein the plurality of measurements corresponds to the plurality of active reference signals.

8. The method of claim 7, further comprising:
calculating a path-loss estimate using the plurality of active reference signals in accordance with the threshold duration, wherein the uplink transmit power is further based at least in part on the path-loss estimate.

9. The method of claim 1, wherein:
the MAC-CE updates the reference signal to indicate a beam to use for the uplink message; and
the uplink message is transmitted using the indicated beam.

10. The method of claim 1, wherein the path-loss estimation is associated with a beam pair used to communicate the updated reference signal and the uplink message.

11. The method of claim 1, wherein the MAC-CE deactivates a second reference signal of the plurality of reference signals.

12. An apparatus for wireless communications at a user equipment (UE), comprising:
a processor;
memory coupled with the processor; and
instructions stored in the memory and executable by the processor to cause the apparatus to:
receive, from a network entity, a configuration for a plurality of reference signals for path-loss estimation;
receive, from the network entity, a medium access control-control element (MAC-CE) updating a reference signal from the plurality of reference signals to use for the path-loss estimation;
update the reference signal in response to receiving the MAC-CE, wherein the instructions to update the reference signal are executable by the processor to cause the apparatus to activate the reference signal from the plurality of reference signals to use for the path-loss estimation;
perform layer 3 filtering on a plurality of measurements for the path-loss estimation, wherein the instructions to perform the layer 3 filtering is based at least in part on activating the reference signal; and
transmit an uplink message according to an uplink transmit power based at least in part on the layer 3 filtering.

13. The apparatus of claim 12, wherein the instructions are further executable by the processor to cause the apparatus to:
receive, from the network entity, a plurality of repetitions of the updated reference signal in accordance with a periodicity of the updated reference signal, wherein the plurality of measurements corresponds to the received plurality of repetitions of the updated reference signal.

14. The apparatus of claim 13, wherein the instructions are further executable by the processor to cause the apparatus to:
perform the plurality of measurements on the received plurality of repetitions of the updated reference signal.

15. The apparatus of claim 12, wherein the instructions are further executable by the processor to cause the apparatus to:
calculate a path-loss estimate based at least in part on the updated reference signal and the layer 3 filtering, wherein the uplink transmit power is further based at least in part on the path-loss estimate.

16. The apparatus of claim 12, wherein the instructions are further executable by the processor to cause the apparatus to:
receive, from the network entity, a threshold quantity of active reference signals corresponding to the updated reference signal, wherein the plurality of measurements corresponds to the threshold quantity of active reference signals.

17. The apparatus of claim 16, wherein the instructions are further executable by the processor to cause the apparatus to:
calculate a path-loss estimate using the threshold quantity of active reference signals, wherein the uplink transmit power is further based at least in part on the path-loss estimate.

18. The apparatus of claim 12, wherein the instructions are further executable by the processor to cause the apparatus to:
receive, from the network entity, a plurality of active reference signals corresponding to the updated reference signal in accordance with a threshold duration for performing the plurality of measurements, wherein the plurality of measurements corresponds to the plurality of active reference signals.

19. The apparatus of claim 18, wherein the instructions are further executable by the processor to cause the apparatus to:
calculate a path-loss estimate using the plurality of active reference signals in accordance with the threshold duration, wherein the uplink transmit power is further based at least in part on the path-loss estimate.

20. The apparatus of claim 12, wherein:
the MAC-CE updates the reference signal to indicate a beam to use for the uplink message; and
the instructions executable by the processor to cause the apparatus to transmit the uplink message are executable by the processor to cause the apparatus to transmit the uplink message using the indicated beam.

21. The apparatus of claim 12, wherein the path-loss estimation is associated with a beam pair used to communicate the updated reference signal and the uplink message.

22. The apparatus of claim 12, wherein the MAC-CE deactivates a second reference signal of the plurality of reference signals.

23. An apparatus for wireless communications at a user equipment (UE), comprising:
- means for receiving, from a network entity, a configuration for a plurality of reference signals for path-loss estimation;
- means for receiving, from the network entity, a medium access control-control element (MAC-CE) updating a reference signal from the plurality of reference signals to use for the path-loss estimation;
- means for updating the reference signal in response to receiving the MAC-CE, wherein the means for updating the reference signal includes means for activating the reference signal from the plurality of reference signals to use for the path-loss estimation;
- means for performing layer 3 filtering on a plurality of measurements for the path-loss estimation, wherein the means for performing the layer 3 filtering is based at least in part on the means for activating the reference signal; and
- means for transmitting an uplink message according to an uplink transmit power based at least in part on the layer 3 filtering.

24. The apparatus of claim 23, further comprising:
- means for calculating a path-loss estimate based at least in part on the updated reference signal and the layer 3 filtering, wherein the uplink transmit power is further based at least in part on the path-loss estimate.

25. A non-transitory computer-readable medium storing code for wireless communications at a user equipment (UE), the code comprising instructions executable by a processor to:
- receive, from a network entity, a configuration for a plurality of reference signals for path-loss estimation;
- receive, from the network entity, a medium access control-control element (MAC-CE) updating a reference signal from the plurality of reference signals to use for the path-loss estimation;
- update the reference signal in response to receiving the MAC-CE, wherein the instructions to update the reference signal are executable by the processor to activate the reference signal from the plurality of reference signals to use for the path-loss estimation;
- perform layer 3 filtering on a plurality of measurements for the path-loss estimation, wherein the instructions to perform the layer 3 filtering is based at least in part on activating the reference signal; and
- transmit an uplink message according to an uplink transmit power based at least in part on the layer 3 filtering.

26. The apparatus of claim 23, further comprising:
- means for receiving, from the network entity, a plurality of repetitions of the updated reference signal in accordance with a periodicity of the updated reference signal, wherein the plurality of measurements corresponds to the received plurality of repetitions of the updated reference signal.

27. The apparatus of claim 26, further comprising:
- means for performing the plurality of measurements on the received plurality of repetitions of the updated reference signal.

28. The apparatus of claim 23, further comprising:
- means for receiving, from the network entity, a threshold quantity of active reference signals corresponding to the updated reference signal, wherein the plurality of measurements corresponds to the threshold quantity of active reference signals.

29. The apparatus of claim 23, wherein the path-loss estimation is associated with a beam pair used to communicate the updated reference signal and the uplink message.

30. The apparatus of claim 23, wherein the MAC-CE deactivates a second reference signal of the plurality of reference signals.

* * * * *